(12) United States Patent
Siaperas

(10) Patent No.: US 12,727,553 B2
(45) Date of Patent: Sep. 8, 2026

(54) FULCRUM ROLLER FOR USE WITH HEAVY EQUIPMENT

(71) Applicant: 106 Reforestation, LLC, Sandy, UT (US)

(72) Inventor: Michael A Siaperas, Sandy, UT (US)

(73) Assignee: 106 Reforestation, LLC, Sandy, UT (US)

( * ) Notice: Subject to any disclaimer, the term of this patent is extended or adjusted under 35 U.S.C. 154(b) by 790 days.

(21) Appl. No.: 17/098,158

(22) Filed: Nov. 13, 2020

(65) Prior Publication Data

US 2022/0151166 A1 May 19, 2022

(51) Int. Cl.
*A01G 23/06* (2006.01)
*A01B 29/00* (2006.01)
*A01B 29/02* (2006.01)

(52) U.S. Cl.
CPC .............. *A01G 23/06* (2013.01); *A01B 29/00* (2013.01); *A01B 29/02* (2013.01)

(58) Field of Classification Search
CPC ..... A01G 20/35; E01C 19/235; E01C 19/268; E01C 19/23; A01B 29/00; A01B 29/02; A01B 29/04; A01B 29/045; A01B 29/06
USPC .......................................................... 171/144
See application file for complete search history.

(56) References Cited

U.S. PATENT DOCUMENTS 438,989 A * 10/1890 Decker .................. A01B 49/02 172/180
606,687 A * 7/1898 Seymour ................ A01B 29/02 172/350
979,666 A * 12/1910 Hargrave ............... A01B 29/02 172/350
1,120,515 A * 12/1914 Dunham ................. E01C 19/23 172/350
1,120,820 A * 12/1914 Karl ....................... A01B 29/02 172/350
1,174,698 A * 3/1916 Dunham ................. E01C 19/23 172/350
1,229,868 A * 6/1917 Black ................... A01B 29/045 172/554
1,312,450 A * 8/1919 McCoy ................ A01G 23/067 144/24.12
1,445,104 A * 2/1923 Alfred .................. A01G 23/062 254/218
1,529,797 A * 3/1925 Gray ...................... A01B 29/02 404/124

(Continued)

OTHER PUBLICATIONS

"'Bowling' Down Forests for a Super Dam," Popular Mechanics, Aug. 1950; https://books.google.com/books?id=0dgDAAAAMBAJ&pg=PA90&source=gbs_toc_r&cad=2#v=onepage&q&f=false (Year: 1950).*

(Continued)

*Primary Examiner* — Christopher J Sebesta
*Assistant Examiner* — Audrey L Lusk
(74) *Attorney, Agent, or Firm* — TechLaw Ventures, PLLC; Terrence J. Edwards

(57) ABSTRACT

Improved devices for use in executing a tree felling operation are disclosed. A device includes a midsection comprising a cylindrical shape and a midsection diameter. The device includes an end plate comprising an elliptical shape and an end plate diameter, wherein the end plate diameter is smaller than the midsection diameter. The device includes a stabilizing section attached to a concentric perimeter of the midsection on a first end and attached to a perimeter of the end plate on a second end.

20 Claims, 18 Drawing Sheets

(56) References Cited

U.S. PATENT DOCUMENTS

| | | | | | |
|---|---|---|---|---|---|
| 1,553,692 | A * | 9/1925 | Thomas | A01G 23/065 | 254/242 |
| 1,607,672 | A * | 11/1926 | Gray | A01B 29/02 | 404/122 |
| 2,580,084 | A * | 12/1951 | Donnelly | A01B 29/02 | 172/350 |
| 2,626,496 | A * | 1/1953 | Ritzert | A01B 29/02 | 404/125 |
| 2,901,878 | A * | 9/1959 | Johnson | A01G 3/06 | 172/15 |
| 2,959,201 | A * | 11/1960 | Letourneau | A01B 29/045 | 144/34.2 |
| 3,515,220 | A * | 6/1970 | Reece | B62D 51/04 | 172/123 |
| 4,090,283 | A * | 5/1978 | Woolley | A63C 17/24 | 301/5.303 |
| 4,240,510 | A * | 12/1980 | Morin | A01G 23/093 | 172/554 |
| 4,355,670 | A * | 10/1982 | Ohrberg | A01G 23/093 | 144/34.1 |
| 4,438,819 | A * | 3/1984 | Ryals | A01B 13/16 | 404/127 |
| 5,613,537 | A * | 3/1997 | Gassiott | A01G 23/067 | 144/34.1 |
| 5,692,689 | A * | 12/1997 | Shinn | A01G 23/093 | 144/334 |
| 5,769,169 | A * | 6/1998 | Miksitz | A01B 29/06 | 111/128 |
| 7,562,517 | B1 * | 7/2009 | Kornecki | A01B 13/02 | 172/554 |
| 8,196,623 | B1 * | 6/2012 | Heath | A01G 23/067 | 241/292.1 |
| 8,534,460 | B2 * | 9/2013 | Wnek | B65G 59/066 | 206/518 |
| 10,625,269 | B1 * | 4/2020 | Peterson | B02C 18/142 | |
| 2011/0020063 | A1 * | 1/2011 | Abresch | E01C 23/0993 | 404/94 |
| 2022/0041403 | A1 * | 2/2022 | McCullagh | B65H 75/4486 | |

OTHER PUBLICATIONS

“Bowling Down Forests for a Super Dam”, Popular Mechanics, vol. 94, pp. 90-95, Aug. 1, 1950.

(https://cfs.nrcan.gc.ca/terms/browse/C), Natural Resources Canada, “Glossary,” Government of Canada, p. C, Dec. 25, 2019, 8 pages.

* cited by examiner

FULCRUM ROLLER FOR USE WITH HEAVY EQUIPMENT

TECHNICAL FIELD

The disclosure relates to systems and devices for use in connection with heavy equipment, and particularly relates to a fulcrum roller.

BACKGROUND

Heavy equipment and heavy machinery can be exceptionally dangerous to operate. Heavy equipment by its nature is large, heavy, and capable of causing injury to people or animals and causing damage to property. One implementation where heavy equipment is particularly dangerous is tree felling operations. Tree felling operations may be executed to cut down and remove trees and other plant life to promote the wellbeing of an ecosystem, to curtail the spread of wildfires, and for other reasons. Because tree felling operations include cutting down and hauling away mature trees that can be heavy, large, and dangerous to heavy equipment operators, tree felling is inherently a dangerous task. Therefore, there is a desire to develop systems, methods, and devices that increase the safety and efficiency of tree felling operations and reduce the likelihood that accidents will occur when operating heavy equipment.

In light of the foregoing, disclosed herein are systems, methods, and devices for improved fulcrum rollers for use in connection with a tree felling operation.

BRIEF DESCRIPTION OF THE DRAWINGS

Non-limiting and non-exhaustive implementations of the disclosure are described with reference to the following figures, wherein like reference numerals refer to like or similar parts throughout the various views unless otherwise specified. Advantages of the disclosure will become better understood with regard to the following description and accompanying drawings where.

DETAILED DESCRIPTION

Figure 1:
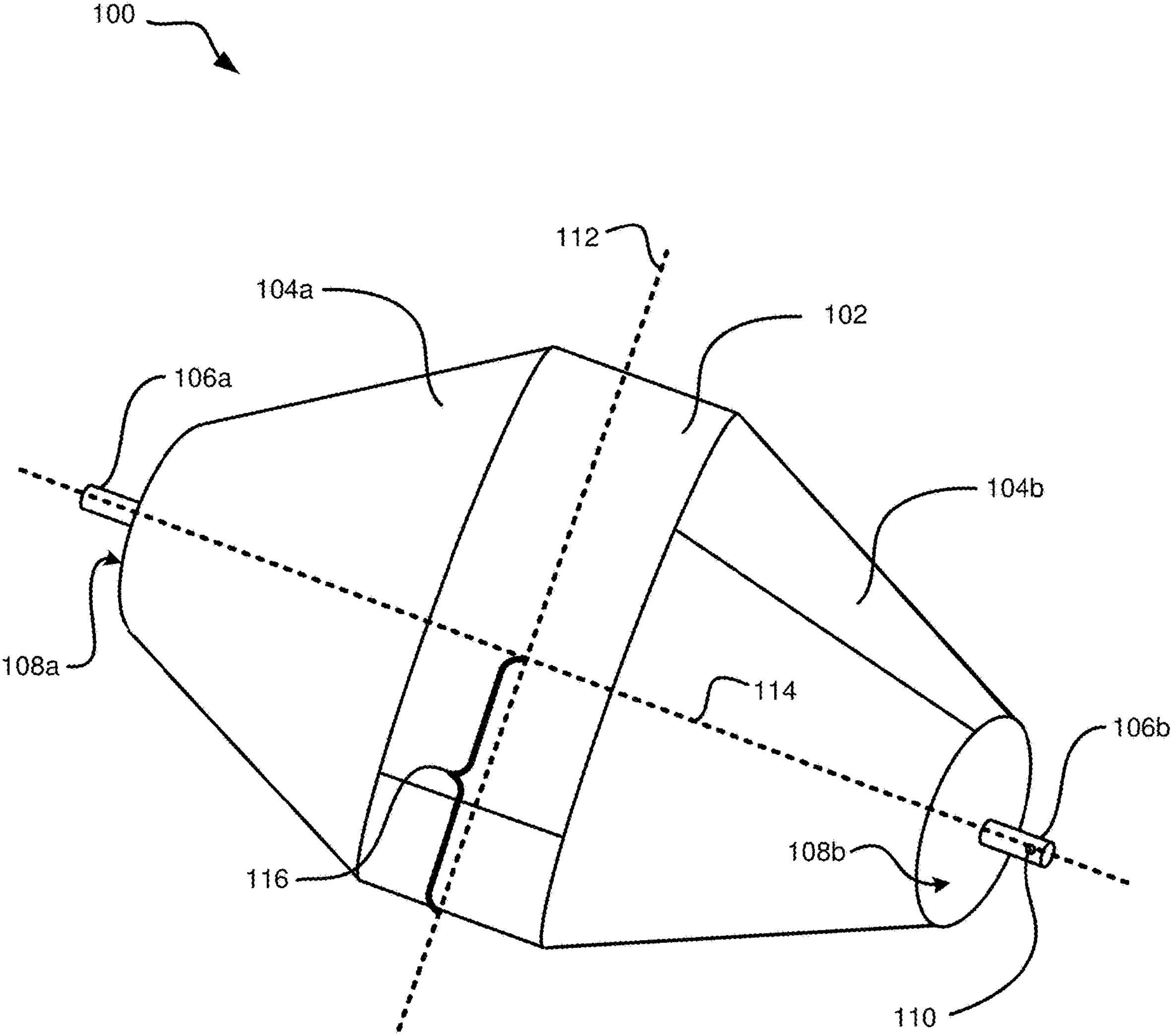
FIG. 1 is a side isometric view of an embodiment of a fulcrum roller.

Disclosed herein are systems, methods, and devices for tree felling operations with heavy equipment and a roller. Specifically, disclosed herein are improved embodiments for a roller that may be used in connection with two or more heavy equipment dozers for uprooting, knocking down, and or crushing trees and other plant life during a tree felling operation.

One means for preventing future forest fires and curtailing the spread of an active fire is the method of tree felling or logging. Tree felling is a forestry and logging practice in which most or all trees in an area are uniformly cut down. Tree felling is used by foresters to create certain types of forest ecosystems and to promote select species that require an abundance of sunlight or grow in large even-age stands. Tree felling can be used to curtail the spread of a forest fire by creating a gap in the tree growth, and thereby preventing the fire from spreading tree-to-tree.

One method of tree felling includes the use of heavy equipment configured to cut down trees in its path. This process of tree felling can be exceptionally dangerous for the heavy equipment operator. Trees can repeatedly fall on top of the heavy equipment and endanger the life and safety of the operator. Traditional methods of tree felling present numerous dangers for the tree felling operators, and therefore, it is desirable to develop improved, safer methods of tree felling.

In light of the foregoing, disclosed herein are improved embodiments of fulcrum rollers for use in connection with heavy equipment during a tree felling operation. The embodiments described herein enable numerous benefits over rolling devices known in the art. In an embodiment, the roller described herein includes a midsection comprising a cylindrical shape for enabling easy rolling of the roller when the roller is pulled by two or more heavy equipment dozers. The roller described herein may additionally include stabilizing sections on either side of the midsection comprising a conical, mostly conical, or round shape. The stabilizing sections may prevent the roller from tipping over or travelling in an undesirable direction. The roller described herein may additionally include hollow inner cavities wherein a weight, such as water, sand, rocks, or some other weight, can inserted and removed. The weights may be disposed into the interior cavity prior to operation to optimize the mass of the roller and improve the effectiveness of the roller in uprooting trees and other plant life. The weight may further be removed from the interior cavity to reduce the mass of the roller during transport from one location to another.

Before the methods, systems, and devices for improved fulcrum roller systems and devices are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

A detailed description of systems, methods, and devices consistent with embodiments of the disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for clarity, certain technical material that is known in the related art has not been described in detail to avoid unnecessarily obscuring the disclosure.

Figure 9:
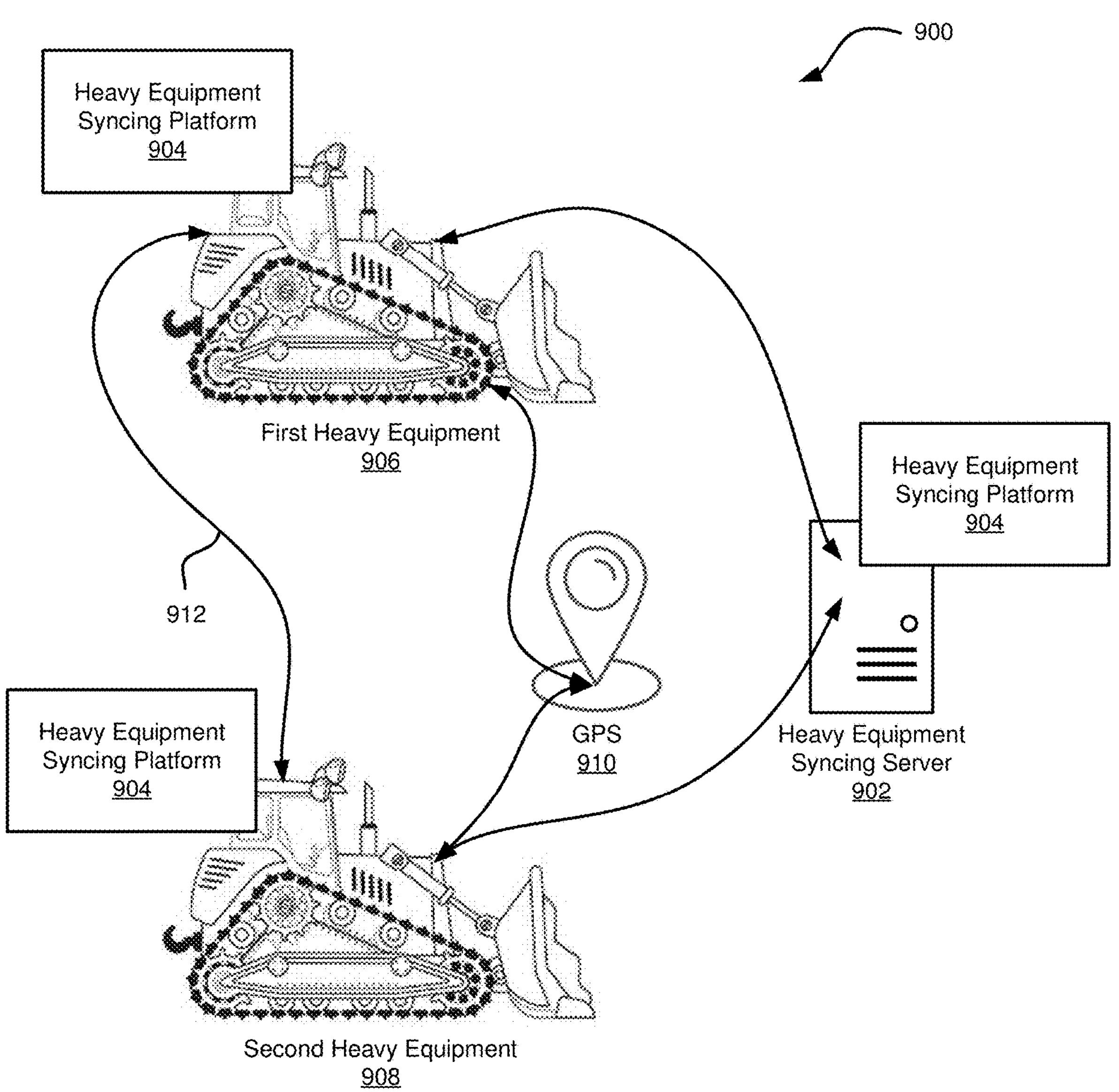
FIG. 9 is a schematic diagram illustrating exemplary components of a system for inter-machine communication.

Referring now to the figures, FIG. 1 is a side isometric view of a roller 100 that may be used in connection with heavy equipment (see, e.g., first heavy equipment 906 and second heavy equipment 908 first illustrated in FIG. 9). The roller 100 may be used with one or more dozers configured for tree felling operations. The roller 100 may alternatively be referred to herein as a "fulcrum roller" to further denote its function and benefits when used in a system such as the system 900 first illustrated in FIG. 9.

The roller 100 embodiments described herein enable numerous benefits over other rolling devices known in the art. The roller 100 embodiments described herein may be particularly effective for executing a tree felling operation, such as those illustrated in FIGS. 10-16. Known embodiments of rolling devices used for tree felling operations may have a fully cylindrical shape, such that the rolling device looks similar to a can. The rolling devices with a fully cylindrical shape introduce numerous difficulties and can increase the dangers of executing the tree felling operation. The fully cylindrical shape is difficult to move and frequently tips up on its ends. When the fully cylindrical rolling device tips on its end, the rolling device becomes difficult to pull laterally and must be adjusted and moved before the tree felling operation can resume. The roller 100 embodiments described herein include a novel football-style shape that enables numerous improvements in efficiency, safety, and effectiveness relative to the can-style shapes known in the art.

In an implementation, the roller 100 is secured to one or more cables. The roller 100 may be secured to a first cable on a first end and secured to a second cable on a second end. The first cable may additionally be secured to a first dozer and the second cable may additionally be secured to a second dozer such that the roller 100 is positioned in between two dozers. The dozers may drive in parallel and the one or more cables may cause the roller 100 to be dragged or pulled by the dozers. In an implementation, the roller 100 is located at a midpoint of the one or more cables such that the roller 100 is equidistant from each of the two dozers. The roller 100 may be configured for ensuring the one or more cables remain at a certain distance above the ground. In an example use-case, it is desirable that the cable remains about four feet above ground to ensure trees are successfully uprooted. In such a use-case, the roller may be sized such that the cable is about four feet above ground when attached to the center of the roller 100. The roller additionally serves as a weight for uprooting trees and ensuring the cable remains in the correct position. The roller 100 may additionally be useful in ensuring the dozers remain on a parallel path in sync with one another. In this implementation, the roller 100 itself does not uproot trees and the cable is responsible for uprooting trees between the first dozer and the second dozer. The roller 100 provides a mass to ensure the cable does not roll up the trees, and further that the cable remains a certain distance above ground.

The roller 100 includes a midsection 102. The midsection 102 may be located at or near the midline 112 of the roller, wherein the midline 112 is located an equivalent distance from a first end plate 108*a* and a second end plate 108*b* of the roller 100. The first end plate 108*a* and the second end plate 108*b* may collectively be referred to herein as end plate 108. The first end plate 108*a* and the second end plate 108*b* are opposite one another on the roller 100. The center of the midsection 102 may be located at or near the midline 112. In an embodiment, the midsection 102 is off-center relative to the midline 112, but is located near the midline 112. In an embodiment, the midsection 102 is centered on the midline 112. The midsection 102 may have a cylindrical shape such that the midsection 102 is "flat" when rolling on the ground when compared with the conical or rounded shape of a first stabilizer section 104*a* and a second stabilizer section 104*b*. The midsection 102 can be used for staging the roller 100 when the cable is being secured to the roller 100. The midsection 102 is additionally used for rigging the roller 100 and ensuring the roller 100 is balanced when being pulled or rolled by the dozers.

Figure 13:
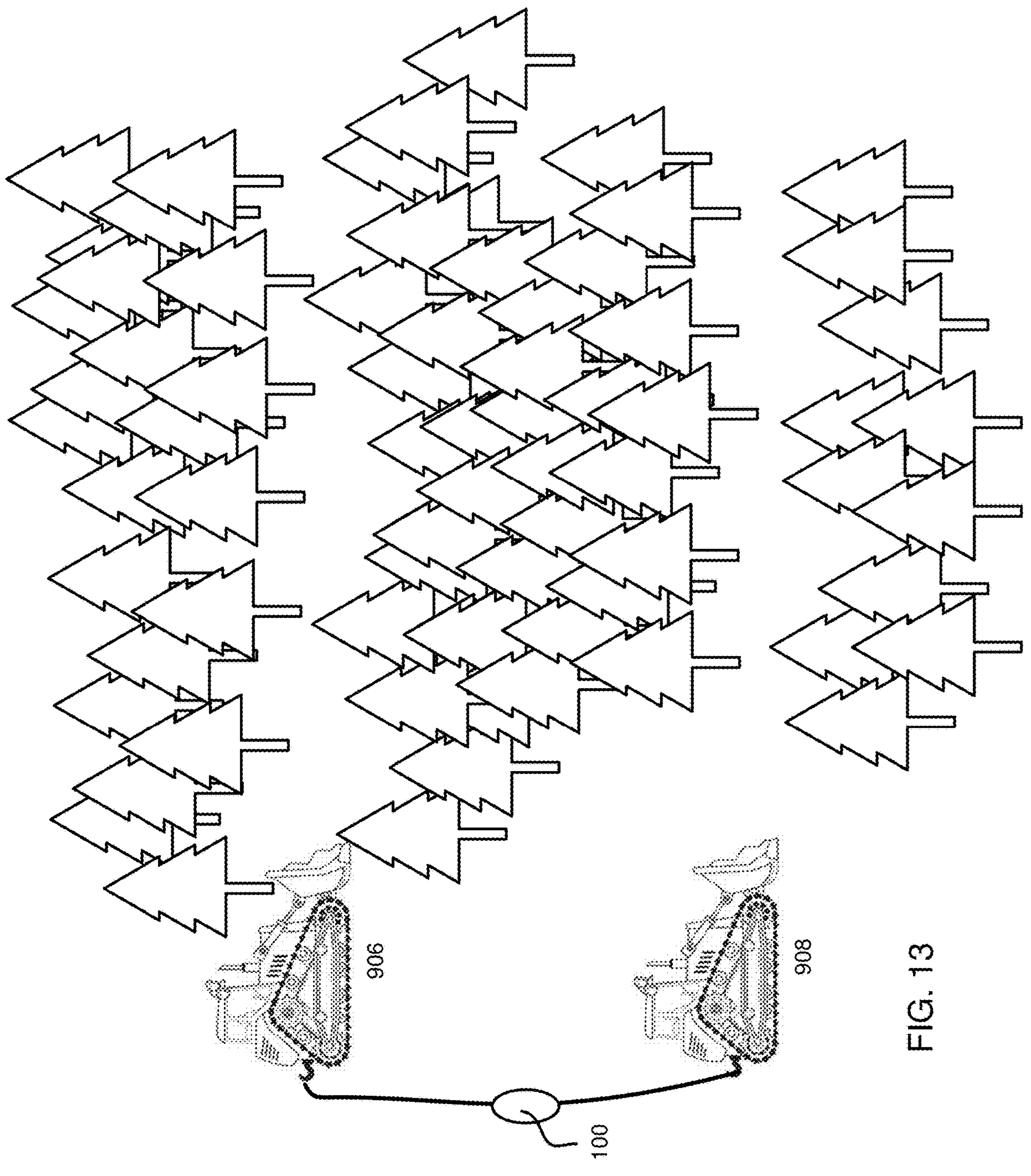
FIG. 13 illustrates execution of a third phase of an exemplary tree felling operation.
Figure 14:
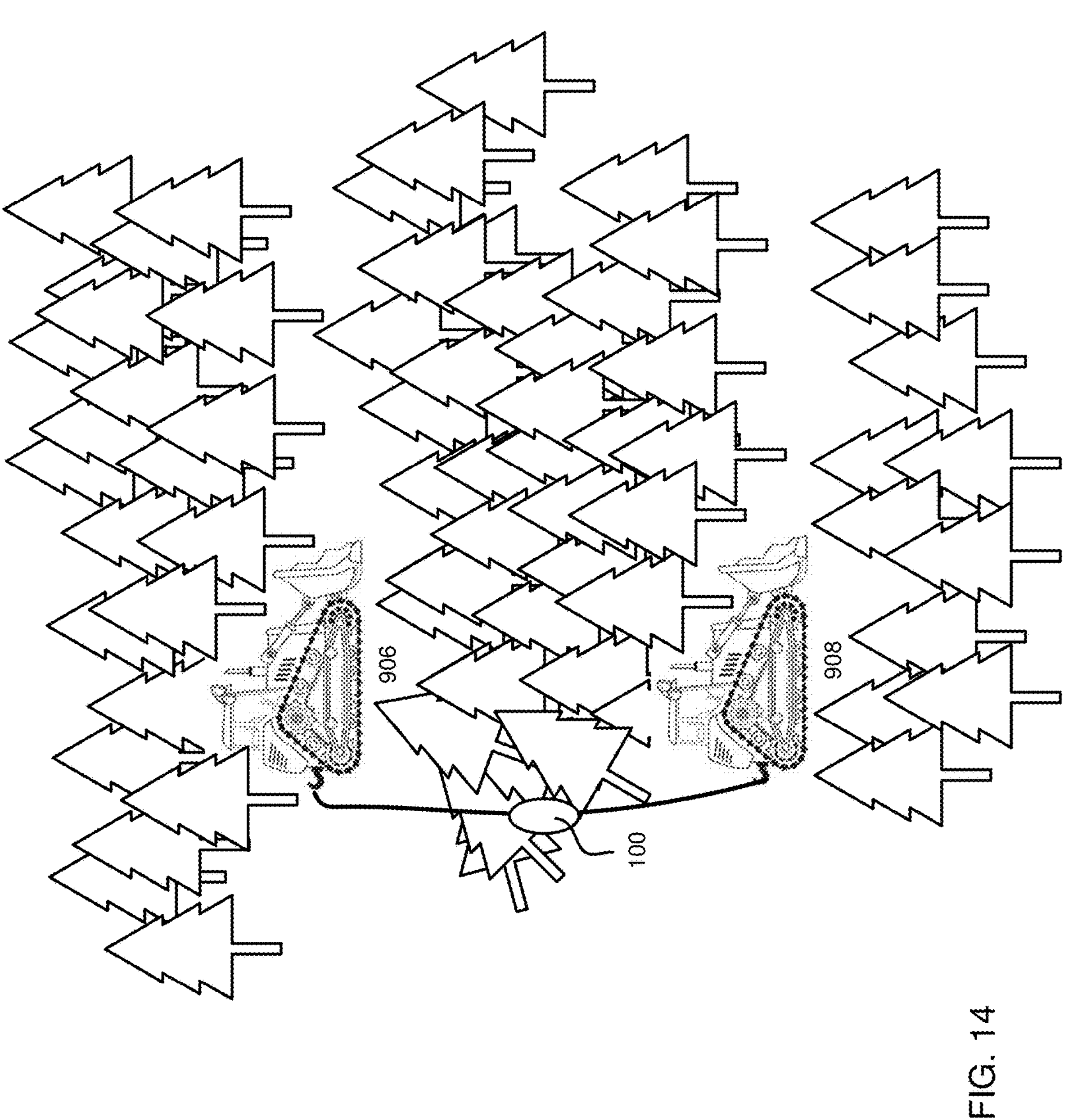
FIG. 14 illustrates execution of a third phase of an exemplary tree felling operation.

The roller 100 includes the first stabilizer section 104*a* and the second stabilizer section 104*b* (collectively referred to herein as "stabilizer section" 104). The exterior walls of the stabilizer sections 104 may have a conical, semi-conical, angled, or rounded shape. The exterior walls of the stabilizer sections 104 may be angled to form an obtuse angle relative to the midline 112 and an acute angle relative to the axis of rotation 114, as shown in FIG. 1. In an embodiment, the stabilizer sections 104 include a plurality of flat portions angling from an edge of the midsection 102 down toward the connection rods 106*a*, 106*b* located at the first end plate 108*a* and the second end plate 108*b*, respectively. The plurality of flat portions may collectively form a semi-conical shape for the stabilizer section 104. The stabilizer sections may be configured to balance, stabilize, or steady the roller 100 when the roller is being pulled by heavy equipment, for example as illustrated in FIGS. 13-14.

The stabilizer sections 104 are tapered from the midsection 102 to the ends where the connection rods 106*a*, 106*b* are attached. This tapered configuration enables numerous benefits during a tree felling operation. When a dozer is travelling on uneven terrain, the dozer will not pull the cable (and the roller 100) with a consistent rate. Additionally, when two dozers are travelling on uneven terrain, the two dozers will not likely pull the roller 100 at a consistent velocity or remain on parallel paths at all times. This causes unbalanced pull pressure because one dozer will pull harder than the other dozer, and this will cause the roller 100 to pull up in that direction. If the roller had a fully cylindrical can-like shape, then the roller would likely tip over on one end when being pulled unevenly by the two dozers. In this case, the tree felling operation must stop, the dozers must back up, the roller must be returned to its desired orientation, and the tree felling operation must begin again. The roller 100 described herein with tapered stabilizing sections 104 avoids these difficulties and will not tip over when experiencing uneven cable pull on each side.

In an embodiment, the length of each of the stabilizer sections 104 is about three feet. It should be appreciated that the dimensions of the roller 100 and the stabilizer sections 104 may be optimized depending on the applicable use-case. The stabilizer sections 104 may have an angled conical shape to prevent the roller 100 from tipping over and additionally prevent the roller 100 and/or the attached cables from lifting up during operation. The tapered shape of the stabilizer sections 104 promotes lateral towing of the roller 100 when the roller is being pulled or dragged by the one or more dozers. It is desirable to ensure that the roller 100 remains on or near the ground, and that the cable attached to the roller 100 remains at the desired height to ensure the tree felling operating can be executed safely and efficiently. When the roller 100 and/or the cable travels up a tree, the tree is more likely to be broken or cracked, rather than uprooted. This introduces numerous dangers for dozer operators and reduces the efficiency of the tree felling operation. The tapered stabilizer sections 104 prevent the roller 100 and the attached one or more cables from running up a tree, and therefore increase the likelihood that the tree will be properly uprooted rather than broken or cracked.

In an embodiment, the axis of rotation 114 is located at the center-point of the midsection 102 and the stabilizing sections 104. The distance between the outmost portion of the roller (at the midsection 102) and the axis of rotation 114 may be optimized for uprooting trees and successfully executing a tree felling operation. In some implementations, the ideal contact point for the cable against a tree for uprooting the tree is about four feet above ground. In such an implementation, the distance from the axis of rotation 114 to ground level may be about four feet when the roller 100 is in use. This distance may be referred to herein as the cable height 116 and is represented by the distance from the axis of rotation 114 to the perimeter of the midsection 102. It should be appreciated that the cable height 116 may be any suitable length depending on the implementation and use-case. In some implementations, depending on the type of tree or other plant life being uprooted, a different cable height 116 may be desirable. The size and configuration of the roller 100 may be adapted to various implementations to ensure the most effective cable height 116 for executing the intended tree felling operation.

The roller 100 includes a first connection rod **106*a* located at the first end plate 108*a* and further includes a second connection rod 106*b* located at the second end plate 108*b*. The first connection rod 106*a* and the second connection rod 106*b* may collectively be referred to herein as connection rod 106. The first connection rod 106*a* and the second connection rod 106*b* may be independent of one another or may be two portions of a single rod. The connection rod 106 may extend through the roller 100 along the axis of rotation 114. The first connection rod 106*a* and the second connection rod 106*b* may be independent of one another and each attached to an end plate of the roller 100. The connection rod 106 may include two or more attachment holes 110 for securing the roller 100 to a cable, heavy equipment, or other device. In an embodiment, the attachment hole 110 is configured for securing the roller 100 to a cable as illustrated in FIGS. 13-14**.

The roller 100 may additionally include an integrated global positioning system (GPS) for tracking the position of the roller 100 during operation. Alternatively, or in addition to the integrated GPS, the roller 100 may include a device for sending and receiving signals by short-range wireless technology, such as Bluetooth® technology or some other means of exchanging data. The roller 100 may be in communication with the heavy equipment syncing platform first illustrated in FIG. 9 (see heavy equipment syncing server 902 and heavy equipment syncing platform 904). The roller 100 may receive information from one or more heavy equipment such as a dozer or other machine (see, e.g. first heavy equipment 906 and second heavy equipment 908 first illustrated in FIG. 9). The roller 100 may receive an indication of the position or future movements of heavy equipment. Additionally, the roller 100 may provide data to the heavy equipment and/or the heavy equipment syncing platform 904. This information may be used to determine, for example, whether the roller 100 is still attached to the one or more cables, whether the roller 100 is contacted with the ground, whether the roller 100 has tipped over, whether the roller 100 is being pulled up a tree or other object, and so forth. In an embodiment, the integrated GPS is attached to a mounting box or plate secured to the roller 100.

In an embodiment, the roller 100 includes one or more inertial measurement units such as an accelerometer, gyroscope, or magnetometer for measuring the specific force, angular rate, and/or orientation of the roller 100. The one or more inertial measurement units may be used to determined whether the roller 100 is upright or has tipped over during operation. In an embodiment, in the event the roller 100 tips over during operation, the roller 100 may provide a notification to the heavy equipment syncing platform 904 indicating the same. The notification may include an alert, data from the one or more inertial measurement units, an indication that the roller 100 is not functional, and so forth. This notification may be provided to operators of heavy equipment 906, 908 to indicate that the tree felling operating should temporarily cease so the roller 100 can be adjusted. This notification may be provided to the heavy equipment syncing platform 904 by way of short-range wireless technology or some other means of exchanging data.

In an embodiment, the roller 100 includes a sensor for determining whether the cable is securely attached to the one or more connection rods 106. The roller 100 may additionally include a sensor to calculate the tension of the cable when tied to the one or more connection rods 106. The roller 100 may additionally include a sensor for identifying and calculating rotation of the connection rod 106 and/or whether the cable has bent, swiveled, or been bound. The roller 100 may provide data or notifications to the heavy equipment syncing server 902 to indicate the status of any of these sensors.

Figure 2:
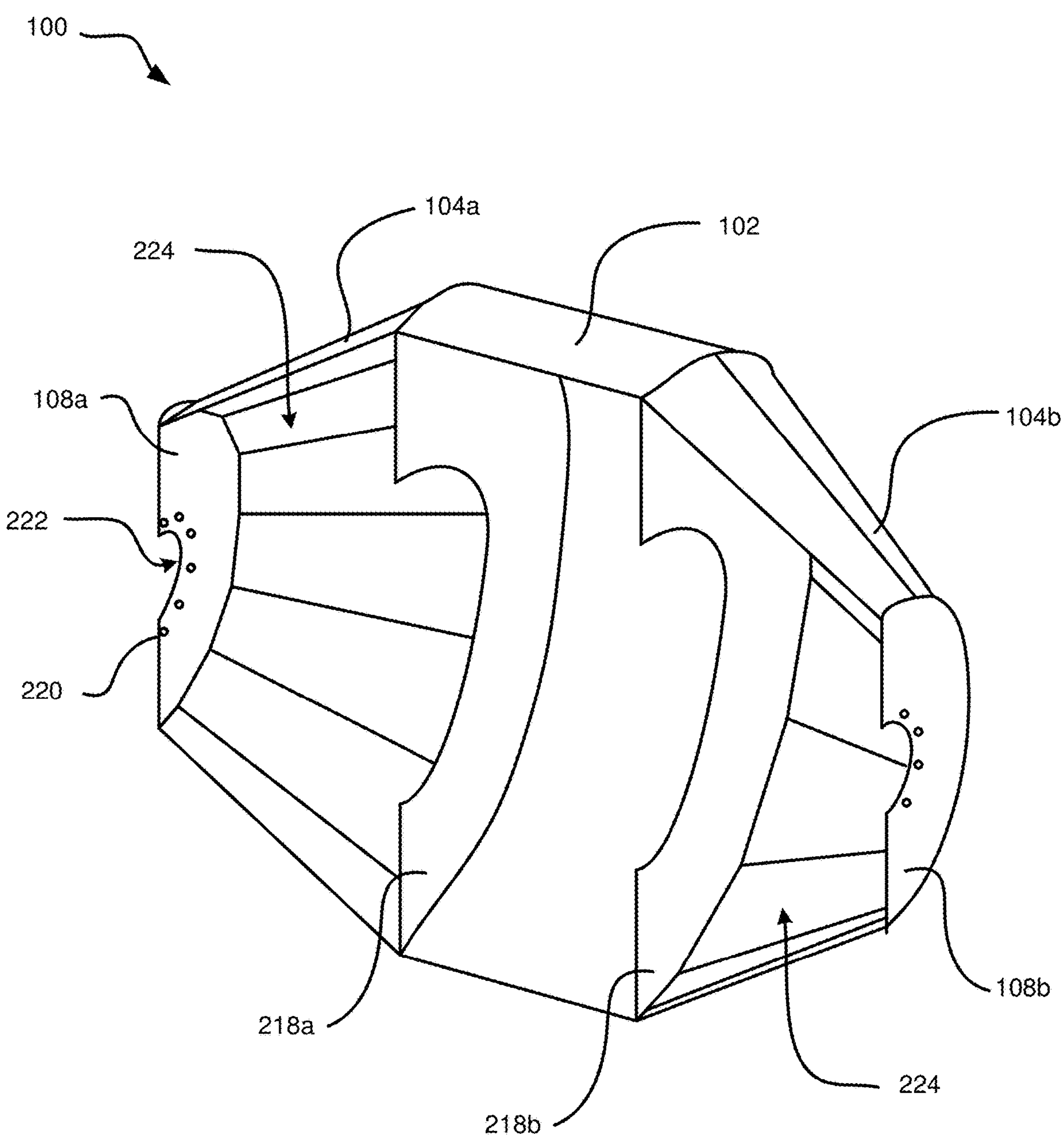
FIG. 2 is a cutaway side isometric view of an embodiment of a fulcrum roller.

FIG. 2 is a cutaway isometric side view of an embodiment of a roller 100. As illustrated in FIG. 2, an embodiment of the roller 100 may include a hollow or mostly hollow interior cavity 224. The hollow interior cavity 224 enables numerous benefits in certain implementations. In an embodiment, the interior cavity 224 may be filled with water, sand, rocks, or some other weight when the roller 100 is in use during a tree felling operation. Further, the interior cavity 224 may be emptied to decrease weight and enable easier transportation when the roller 100 is not in use.

The interior cavity 224 of the roller 100 may include a first brace plate **218*a* and a second brace plate 218*b* disposed within the interior space. The first brace plate 218*a* and the second brace plate 218*b* may be collectively referred to herein as brace plates 218. In an embodiment, the brace plates 218 are located at opposite ends of the midsection 102 as shown in FIG. 2. The brace plates 218 may be located at the concentric ends of the midsection and may serve as a barrier between the midsection 102 portion and the stabilizer sections 104. The brace plates 218 may have an elliptical shape such that the perimeter of the brace plates 218 is secured to the interior wall of the roller 100 at the midsection 102 portion. The brace plates 218 may be located at or near the midsection 102**.

The roller 100 may include an opening 222 within the first end plate 108*a* and/or the second end plate 108*b*. The connection rod 106 may be disposed within the end plate opening 222. The end plate opening 222 may additionally be used to fill the interior cavity with a weight such as water, sand, rocks, or some other material. The end plate opening 222 may include a removable lid or other device for closing the end plate opening 222 from the outside. The end plate opening 222 may have an elliptical, rectangular, or any other suitable shape depending on the application. The roller 100 may include fasteners 220 for securing the end plate 108 to a cable plate (see, e.g. 428 at FIG. 4). The cable plate 428 is attached to the end plate 108 of the roller 100 and provides access for securing the roller 100 to a cable by way of the connection rod 106. The fasteners 220 may include bolts, lug nuts, or some other suitable means of attaching the end plate 108 to the cable plate 428.

Figure 3:
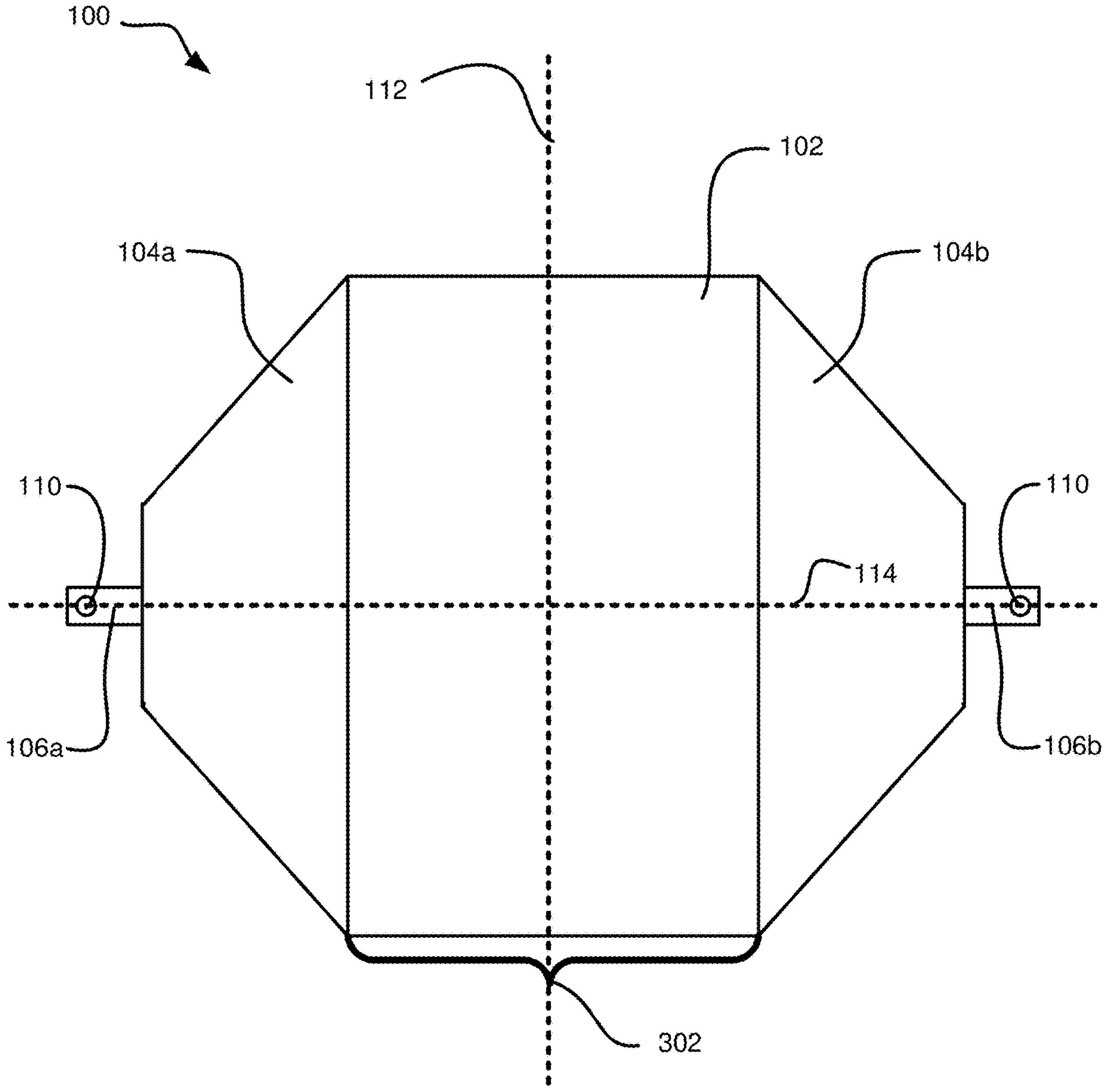
FIG. 3 is a side view of an embodiment of a fulcrum roller.

FIG. 3 is a side view of an embodiment of the roller 100. The relative sizes of the midsection 102 and the stabilizer sections 104 may vary depending on the intended use-case. In some implementations, it may be desirable for the midsection 102 to have a longer width relative to the widths of the stabilizer sections 104. In some implementations, it may be desirable that the midsection 102 and the stabilizer sections 104 have the same width or nearly the same width. In some implementations, it may be desirable that the stabilizer sections 104 have a longer width relative to the midsection 102.

In an embodiment, the cylindrical midsection 102 includes a midsection height 302. The height of the midsection may be defined based on standard measuring practices for a cylindrical shape. In an embodiment, the midsection height 302 is about two feet to five feet. In a particular embodiment, the midsection height 302 is three feet. It should be appreciated that the dimensions of the midsection 102 may be altered depending on the particular use-case. For example, certain trees or forest environments may be easier to uproot with a certain midsection height 302.

Figure 4:
FIG. 4 is a side view of an embodiment of a fulcrum roller.
Figure 4:
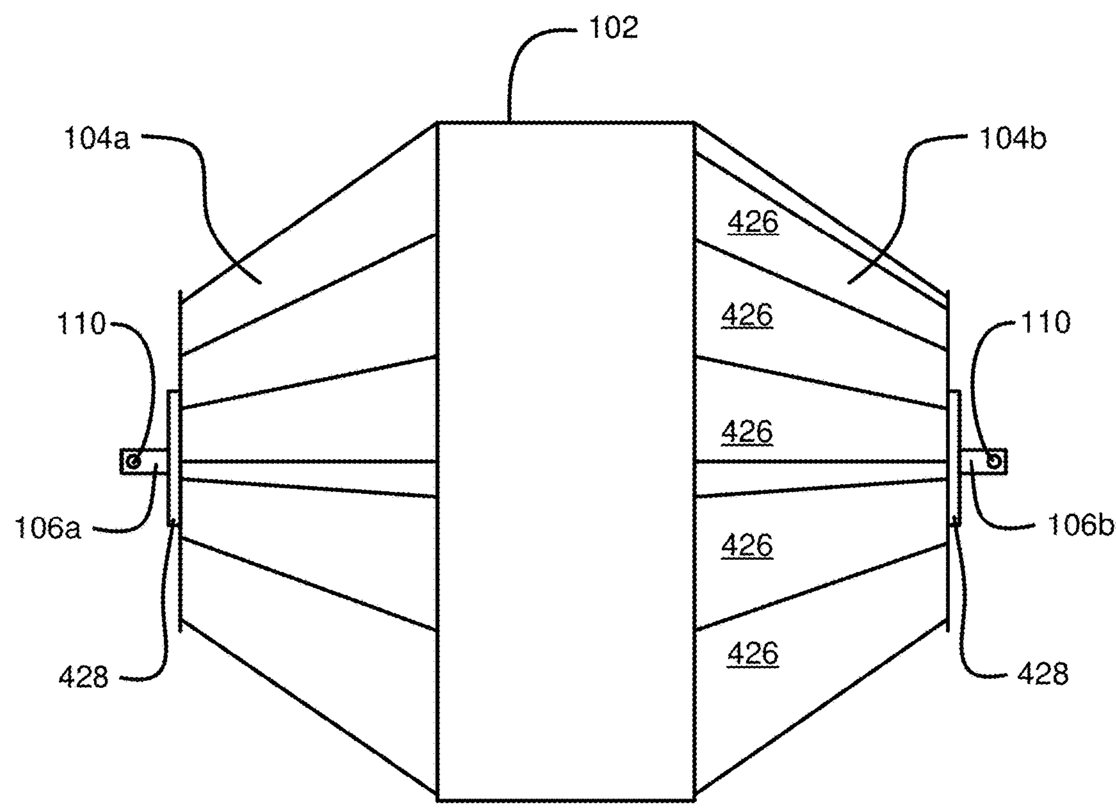

FIG. 4 is a side view of an embodiment of the roller 100. In the embodiment illustrated in FIG. 4, the stabilizer sections 104 of the roller 100 include a mostly conical shape with a plurality of flat portions 426. The flat portions 426 enable numerous benefits during a tree felling operation. The flat portions 426 provide a stable, flat platform where the roller 100 may rest during a tree felling operation such that the roller 100 does not roll freely and the operators lose control of the roller's motion and trajectory. The flat portions 426 may be sized and shaped such that the roller 100 can roll through a tree felling operation with little resistance but will quickly stop rolling when not being actively dragged by heavy equipment.

The flat portions 426 may have the same size and shape, may consists of two sizes and shapes, or may have a range of sizes and shapes, depending on the implementation. The roller 100 may include numerous small flat portions 426 such that the roller 100 has a nearly smooth semi-conical shape. The flat portions 426 of the roller 100 may be wider such that the roller is more likely to quickly stop rolling when not be actively pulled by heavy equipment.

In an embodiment, the roller 100 includes a cable plate 428 that is attached to the end plate 108 by way of fasteners 220. The connection rod 106 may be a component of the cable plate 428 and/or may pass through a hole disposed in the cable plate 428. The cable plate 428 is removable such that sand, water, or some other weight may be disposed in the interior space of the roller 100. In an embodiment, the end plate 108 comprises a hole therethrough, and the cable plate 428 covers that hole when attached to the end plate 108. This is desirable in instances where the roller 100 needs to have a greater mass to be successful in a tree felling operation. The sand, water, or other weight can be disposed into the interior space of the roller 100 prior to operation and may be removed after operation. This reduces the total mass of the roller 100 and further reduces the cost of manufacturing the roller 100 without sacrificing the need to ensure the roller 100 is sufficiently heavy to execute a tree felling operation.

Figure 5:
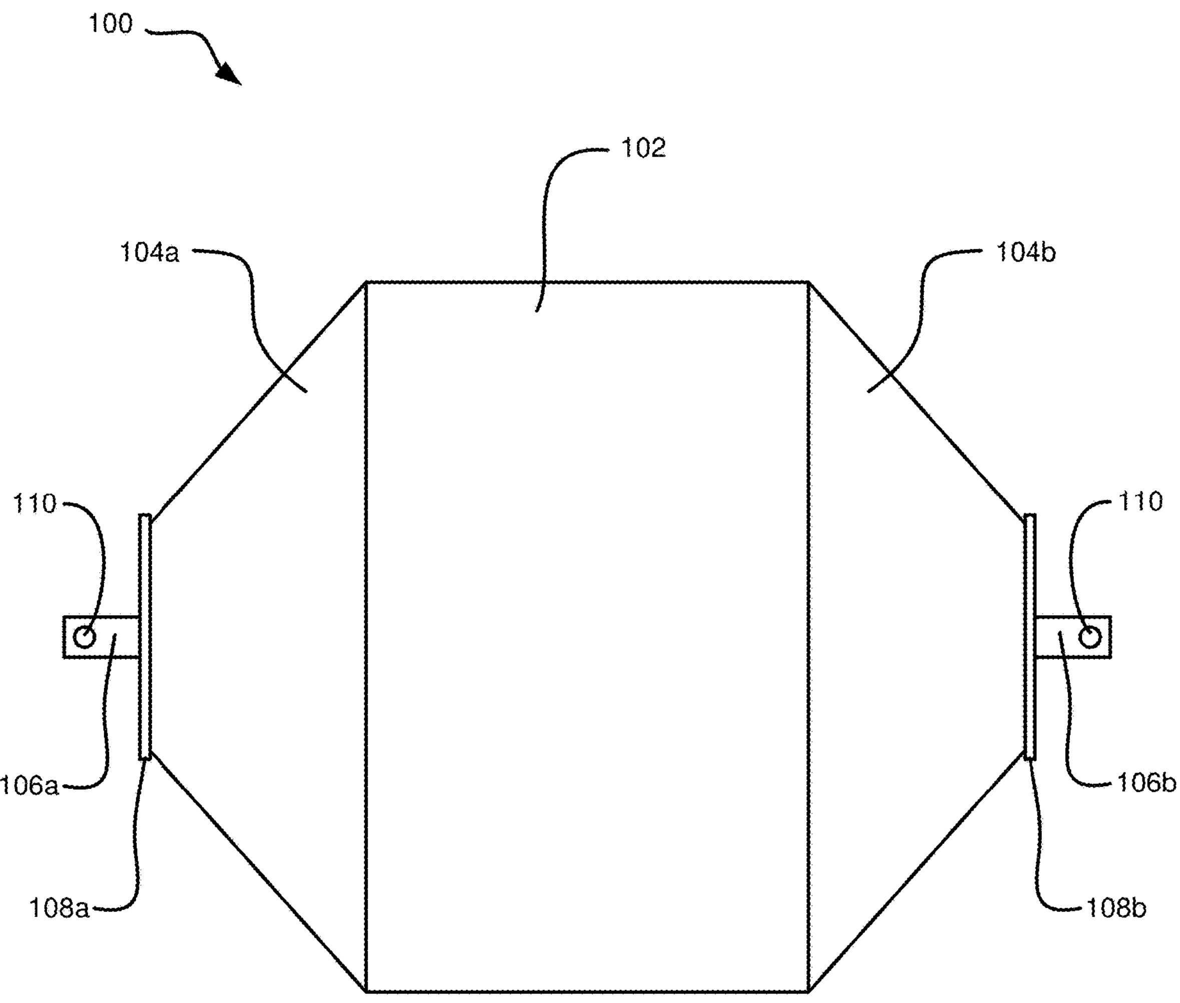
FIG. 5 is a side view of an embodiment of a fulcrum roller.

FIG. 5 is a side view of an embodiment of a roller 100. In an embodiment as illustrated in FIG. 5, the first end plate 108*a* and the second end plate 108*b* comprise a diameter larger than the smaller diameter of the tapered stabilizer sections 104. In an embodiment, the end plate 108 is removably attached to the stabilizer sections 104 such that the end plate 108 can be removed to deposit a weight within the interior cavity 224 of the roller 100. The connection rod 106 may be removably or permanently attached to the end plate 108. In an embodiment, the end plate 108 includes a means to quickly release the connection rod 106 from the end plate 108. The embodiment illustrated in FIG. 5 does not additionally include a cable plate 428 attached to the end plate 108.

Figure 6:
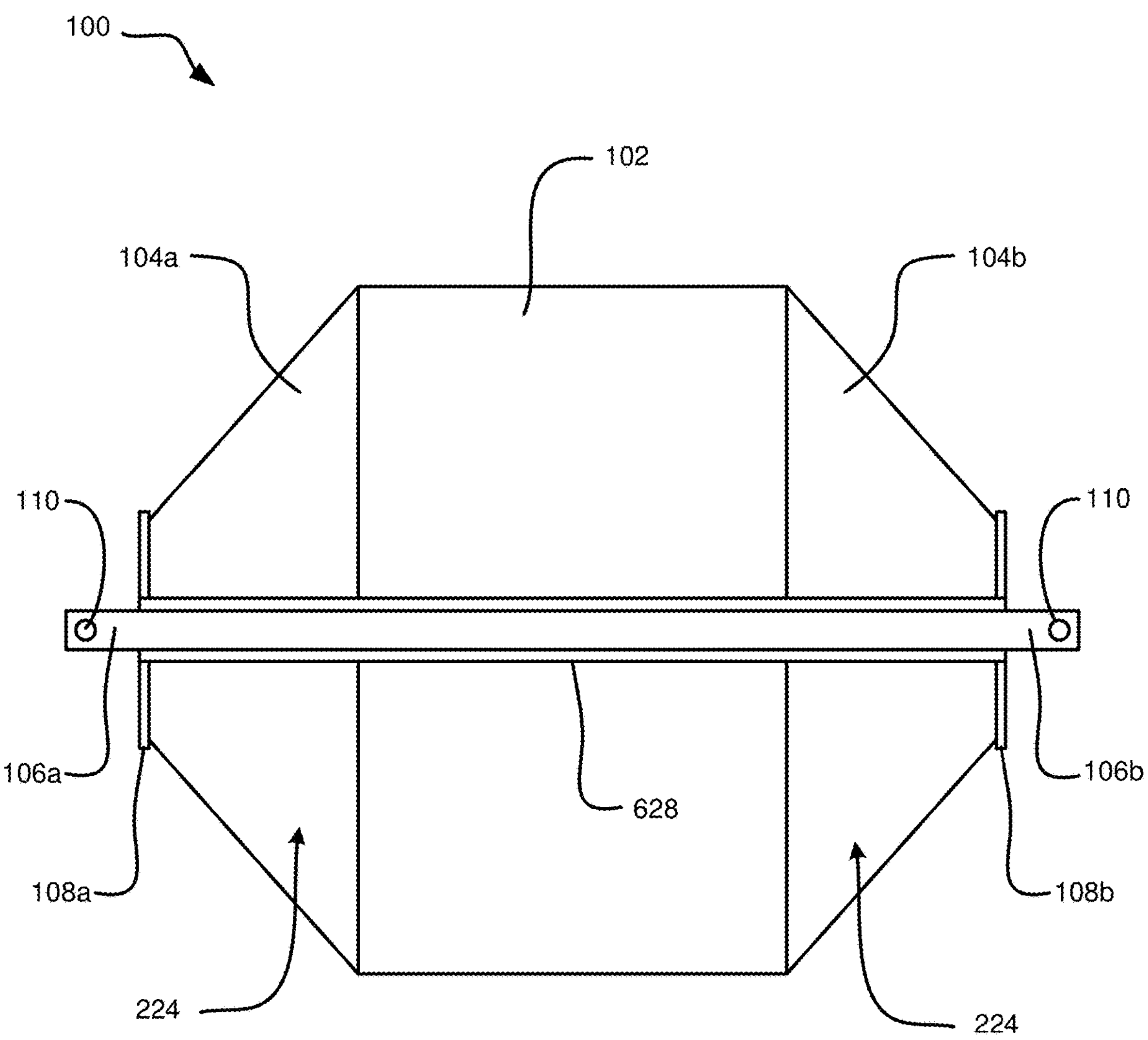
FIG. 6 is a cutaway side view of an embodiment of a fulcrum roller.

FIG. 6 is a cutaway side view of an embodiment of a roller 100. In an embodiment, the roller 100 includes a through-pipe 628 extending through the interior cavity 224 of the roller 100. The interior space of the through-pipe 628 may define a channel or passageway through the interior cavity 224. In an embodiment, the first connection rod 106*a* and the second connection rod 106*b* are opposite ends of a single connection rod 106 comprising a single piece of material. In such an embodiment, the connection rod 106 may be disposed within the through-pipe 628 and secured to the walls of the through-pipe 628. The connection rod 106 may be disposed within the through-pipe 628 in a way that permits the connection rod 106 to freely spin. The through-pipe 628 may be removably or permanently attached to the end plates 108.

Figure 7:
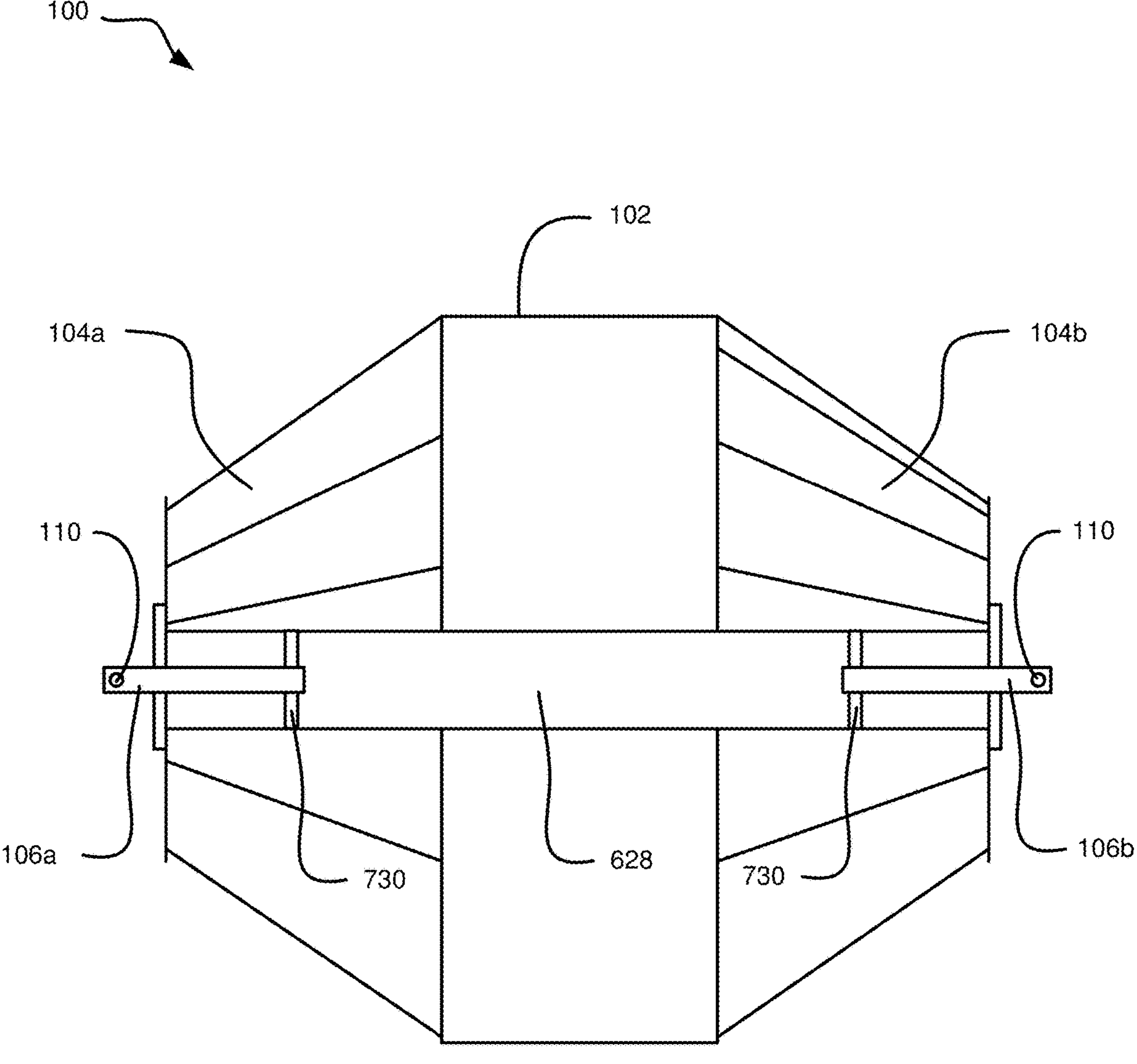
FIG. 7 is a cutaway side view of an embodiment of a fulcrum roller.

FIG. 7 is a cutaway side view of an embodiment of a roller 100. The embodiment illustrated in FIG. 7 includes a through-pipe 628 extending through the interior cavity 224. In this embodiment, the connection rod 106 includes a first connection rod 106*a* independent of the second connection rod 106*b* as illustrated in FIG. 7. The first connection rod 106*a* and the second connection rod 106*b* are each independently secured to the through-pipe 628 by way of fastener pins 730. The fastener pins 730 secure the connection rod 106 to a wall of the through-pipe 628. In this embodiment, the connection rod 106 does not extend the length of the roller 100. This reduces the cost of manufacturing the roller 100 and reduces the total weight of the roller 100. The first connection rod 106*a* and the second connection rod 106*b* may be fastened to the through-pipe 628 such that each connection rod 106*a*, 106*b* can freely spin within the through-pipe 628. This introduces numerous benefits and prevents the attached cable from binding or swiveling.

Figure 8:
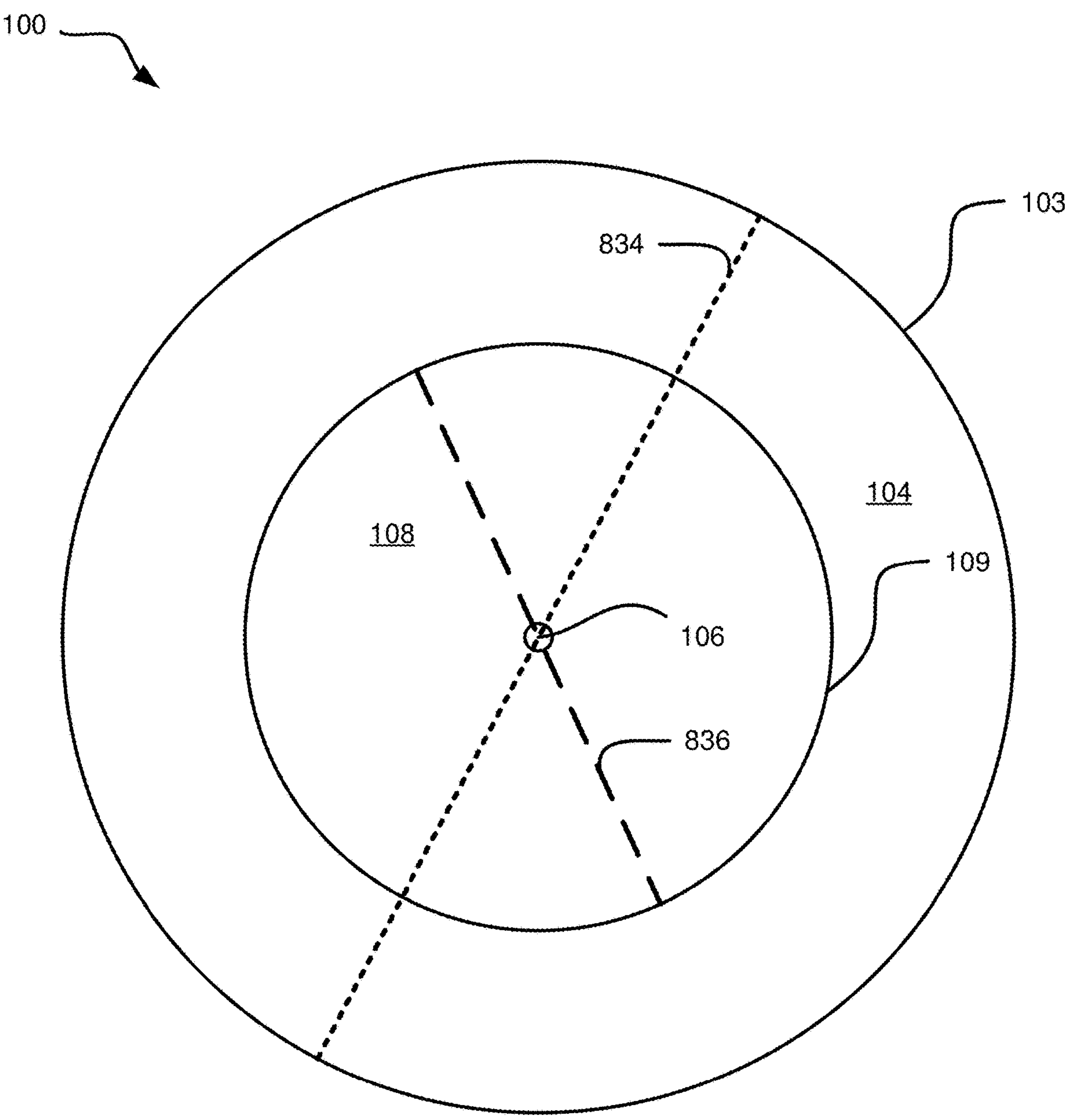
FIG. 8 is an end view of an embodiment of a fulcrum roller.

FIG. 8 is an end view of the roller 100. As illustrated in FIG. 8, the connection rod 106 may be disposed within an end plate 108*a*, 108*b* of the roller 100. The connection rod 106 may be removably or permanently attached to the end plate 108. In an embodiment, the end plate 108 is removably attached to the roller 104 such that a weight, such as water, sand, rocks, or some other weight, can be disposed into the interior cavity 224 of the roller.

As illustrated in FIG. 8, the cylindrical-shaped midsection 102 includes a concentric perimeter 103 represented by the elliptical shape at either end of the cylindrical midsection 102. The concentric perimeter 103 comprises a diameter represented as the midsection diameter 834. The concentric perimeter 103 further includes a radius defined as one-half of the midsection diameter 834. The diameter and radius of the midsection 102 are determined based on customary measurements for a cylindrical object. In FIG. 8, the midsection diameter 834 is illustrated by the small, dotted line.

The elliptical shaped end plate 108 includes an end plate perimeter 109. The end plate perimeter 109 is the outer perimeter of the end plate 108. In an embodiment, the end plate perimeter 109 is smaller than the concentric perimeter 103 of the midsection 102. The end plate 108 includes an end plate diameter 836. The end plate 108 additionally includes a radius defined as one-half of the end plate diameter 109. The end plate diameter 836 is illustrated in FIG. 8 with the larger dotted line. The tapered shape of the stabilizing sections 104 extends from the concentric perimeter 103 of the midsection 102 to the end plate perimeter 109. In an embodiment, the midsection diameter 834 is larger than the end plate diameter 836.

FIG. 9 is a schematic diagram of a system 900 for inter-machine communications. In the exemplary embodiment illustrated in FIG. 9, the system 900 provides for communications between a first heavy equipment 906 and a second heavy equipment 908. As discussed herein, the first heavy equipment 906 and the second heavy equipment 908 may alternatively be referred to as a dozer, bulldozer, or other machinery. It should be appreciated that the system 900 may provide for communication between a single heavy equipment machine and a server, or between three or more heavy equipment machines. The embodiment illustrated in FIG. 9 should not be seen as limiting.

The system provides for communication 912 between the first heavy equipment 906 and the second heavy equipment 908, and additionally provides for communications between heavy equipment and a Global Positioning System (GPS) 910 and a heavy equipment syncing server 902. The heavy equipment server 902 may provide processing operations for a heavy equipment syncing platform 904. The heavy equipment syncing platform 904 may be accessible to one or more users by way of a user interface.

In some implementations, it is important to provide for real-time communications between heavy machinery. Specifically, in tree felling operations, it can be important to provide for real-time communications between two or more dozers. During a tree felling operation, the dozer operators, and the dozer sensor systems, are unable to see one another because there are too many trees and other obstacles between the dozers. In such an operation, it is important to enable real-time communications between the two dozers for the safety of the dozer operators. In an embodiment, each of the first heavy equipment 906 and the second heavy equipment 908 is a dozer configured for cutting trees in a tree felling operation. In such an embodiment, each of the first heavy equipment 906 and the second heavy equipment 908 may be outfitted with a specialized blade for cutting trees and other objects. It should be appreciated that the disclosures herein are not limited to dozers or tree felling operations, and the first and second heavy equipment 906, 908 may represent any heavy equipment or heavy machinery.

The heavy equipment 906, 908 may communicate with a GPS 910. In an embodiment, there is a GPS installed in each of the heavy equipment 906, 908, and the installed GPS is capable of communicating with a satellite (or other location) system for determining the precise global coordinates of the heavy equipment 906, 908. The GPS 910 may be a high-precision positioning system to determine the precise global coordinates of the heavy equipment 906, 908 at any time. In an embodiment, the heavy equipment 906, 908 receives GPS satellite information used with real-time kinematic (RTK) corrections and/or differential GPS (DGPS) corrections. The GPS satellite information with RTK corrections provides for centimeter-level global coordinate accuracy. The GPS satellite information with DGPS corrections provides for sub-meter accuracy. In an embodiment, the RTK corrected GPS satellite information is communicated to the heavy equipment 906, 908 to allow for centimeter-level positional accuracy.

In an embodiment, the global coordinates of the heavy equipment 906, 908 are continually retrieved and time-stamped as the heavy equipment 906, 908 is moving or performing an operation. A log of global coordinates, with the accompanying timestamps, may be stored locally on the heavy equipment 906, 908, may be communicated 912 between heavy equipment 906, 908, and/or may be uploaded to the heavy equipment syncing server 902. This time-stamped log of global coordinates can be assessed to calculate a precise path of the heavy equipment 906, 908 when the heavy equipment 906, 908 was moving or performing an operation. In an embodiment, the timestamped log of global coordinates indicates a precise tree felling path that was completed or is currently in-process by the heavy equipment 906, 908.

The heavy equipment 906, 908 may be in communication with a heavy equipment syncing server 902. In an embodiment, there is two-way communication between the heavy equipment 906, 908 and the heavy equipment syncing server 902. These communications may be carried out by way of a communications satellite that relays and/or amplifies telecommunications signals between the heavy equipment 906, 908 and the heavy equipment syncing server 902. In an embodiment, the heavy equipment 906, 908 communicates with Iridium satellites to upload operations data to the heavy equipment syncing server 902 for remote operations analytics. This may be particularly beneficial when the heavy equipment 906, 908 is located in a remote location with cellular data service. In an embodiment, the heavy equipment 906, 908 communicates with the heavy equipment syncing server 902 by way of cellular data service, such as long-term evolution (LTE) communications. The LTE communications may be 2G, 3G, 4G, 5G, and so forth communications. It should be appreciated that the communications between the heavy equipment 906, 908 and the heavy equipment syncing server 902 may be carried about by any suitable communications technology.

The heavy equipment syncing server 902 provides processing operations for a heavy equipment syncing platform 904. The heavy equipment syncing platform 904 may be provided to a user in a user interface that is accessible on a personal computing device such as a personal computer, a laptop, a mobile phone, and so forth. The heavy equipment syncing platform 904 may be presented in an application that provides downloadable software for a personal computing device and/or on the Internet by way of a web browser. The heavy equipment syncing platform 904 may be available as a Software as a Solution (SaaS) solution for managing the heavy equipment 906, 908 operations, managing data captured by sensors on the heavy equipment 906, 908, managing projects, and so forth.

In an embodiment, the heavy equipment 906, 908 communicate 912 directly with one another. In an embodiment, these communications are accomplished by short-range wireless technology, such as Bluetooth® technology. Bluetooth® is a wireless technology standard used for exchanging data between fixed and/or mobile devices over short distances using short-wavelength ultra-high frequency (UHF) radio waves. In a particular embodiment, the short-range wireless communications are carried out in the radio bands from 2.400 to 2.485 GHz. In an embodiment, the communications 912 between the heavy equipment 906, 908 are carried about via long-range radio signals. In a particular embodiment, the long-range radio signals are carried out in radio frequency bands from 775 MHz to 945 MHz. In a more particular embodiment, the long-range radio signals are carried out in radio frequency bands of 863-870 MHz (for Europe), 902-928 MHz (for Australia and North America), 779-787 MHz (for China), and 900-930 MHz (for other Asian countries and areas). In an even more particular embodiment, the long-range radio signals are carried out in a radio frequency of 868 MHz (for Europe), 915 MHz (for Australia and North America), 780 MHz (for China), and 923 MHz (for other Asian countries and areas). These communications 912 provide vital equipment telemetry between the first heavy equipment 906 and the second heavy equipment 908.

In an exemplary implementation, the first heavy equipment 906 carries out a tree felling operation to cut down trees in a first tree felling track the width of the first heavy equipment 906 blade. During the tree felling operation, the first heavy equipment 906 captures sensor data to determine, for example, the precise coordinates of the first heavy equipment 906 at all times during the tree felling operation, the accelerometer data, gyro meter data, and magnetometer data captured by the first heavy equipment 906 during the tree felling operation, and so forth. This information may be analyzed to calculate a precise path taken by the first heavy equipment 906 and thereby determine the precise location, width, elevation change, and so forth of the first tree felling track that was cut by the first heavy equipment 906. This information may be communicated 912 to the second heavy equipment 908 such that the second heavy equipment 908 can then cut a second tree felling track that is exactly or nearly parallel to the first tree felling track at all time. The first tree felling track and the second tree felling track may be located a set difference apart from one another at all times, for example 250 feet apart from one another, and the two tracks may be exactly parallel. The sensor data captured by the first heavy equipment 906 is communicated 912 to the second heavy equipment 908 to make it possible for the second heavy equipment 908 to cut the second tree felling track exactly parallel to the first tree felling track. Without this communication 912, the two tracks would not be exactly parallel and would likely deviate from one another. It is important for the two tracks to be parallel to ensure the safety of the operators in future tree felling operations, as detailed further below.

Figure 10:
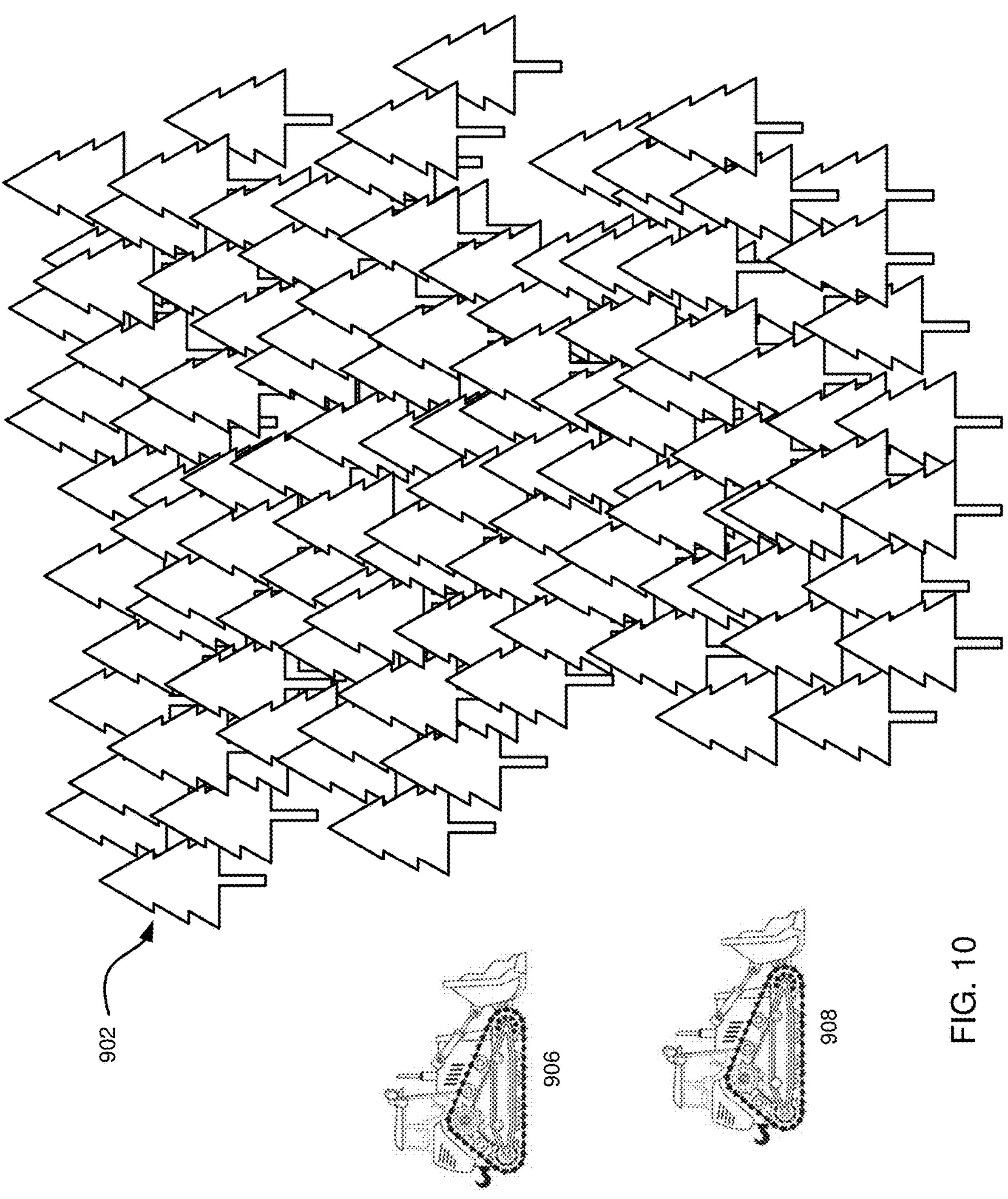
FIG. 10 illustrates an exemplary setup for a tree felling operation.
Figure 11:
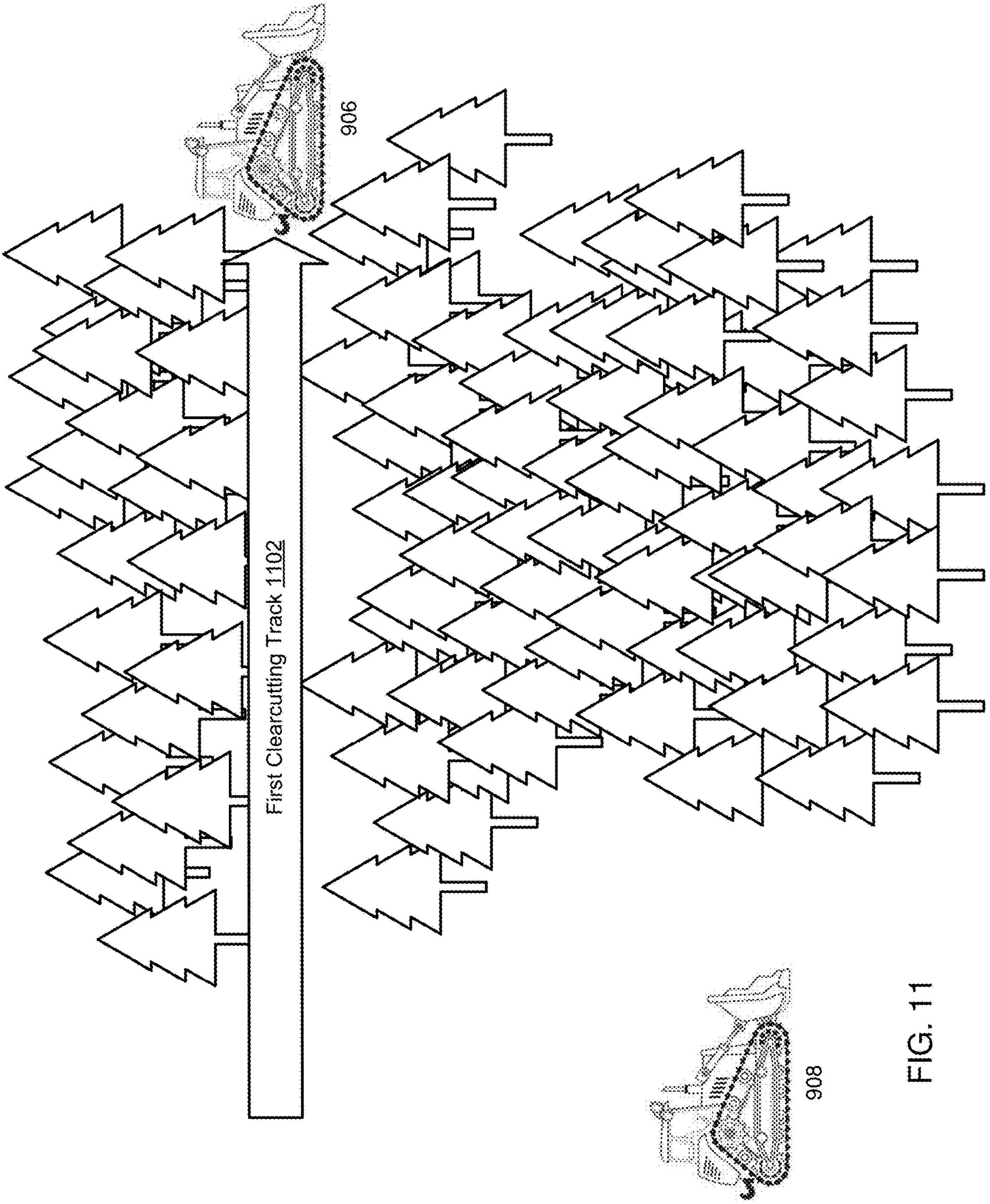
FIG. 11 illustrates execution of a first phase of an exemplary tree felling operation.
Figure 12:
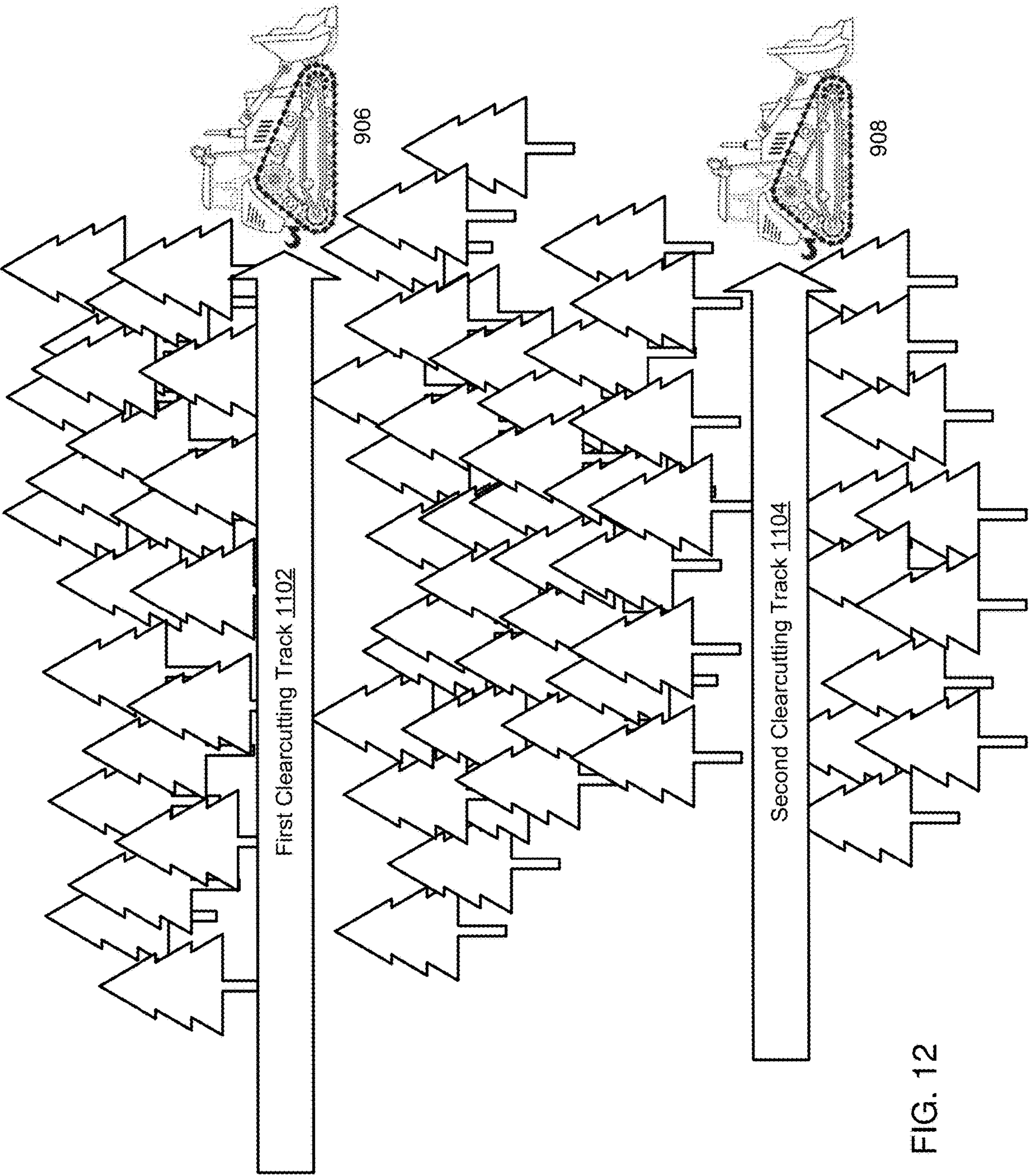
FIG. 12 illustrates execution of a second phase of an exemplary tree felling operation.
Figure 15:
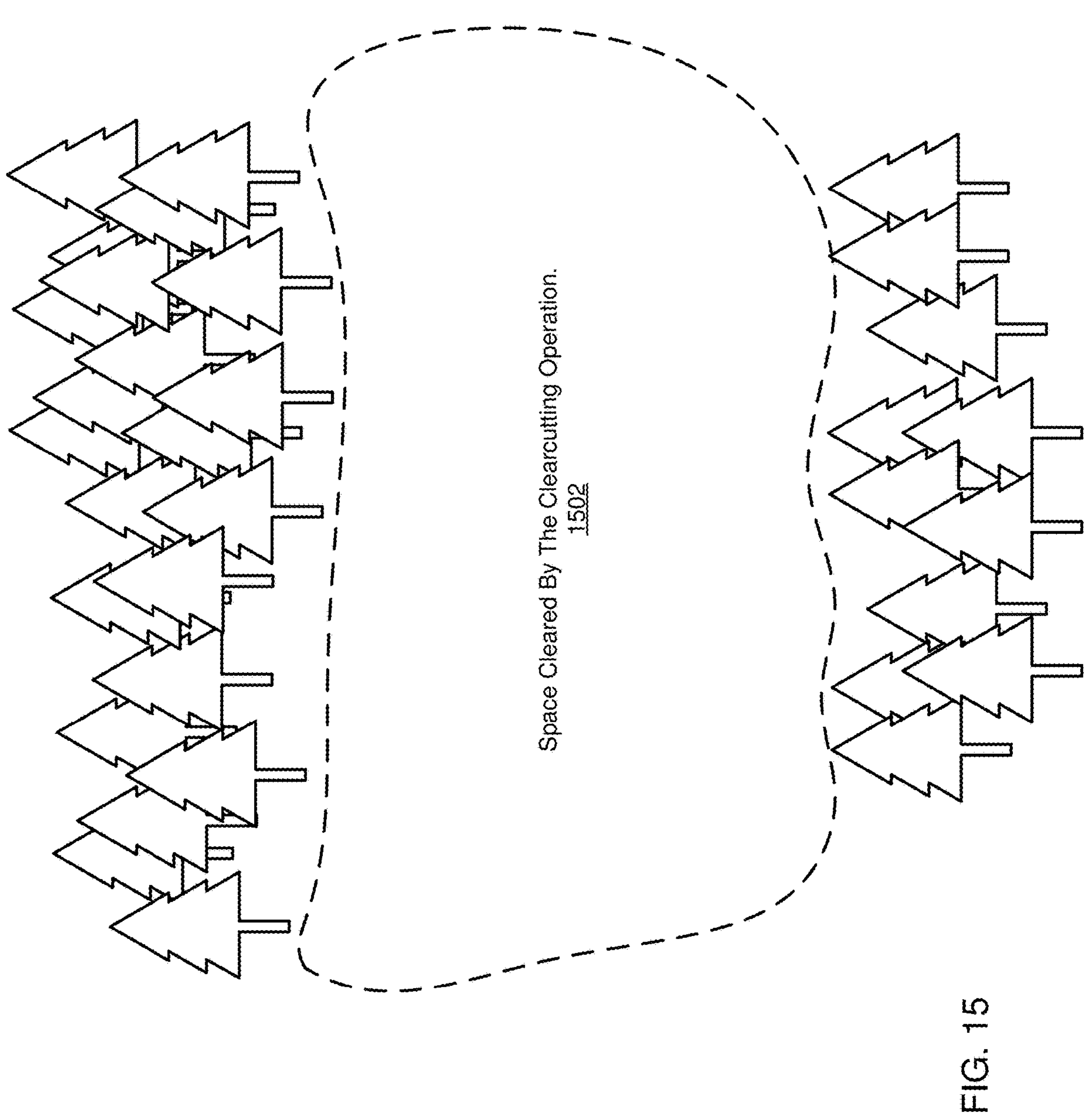
FIG. 15 illustrates the space cleared by a successful tree felling operation.

FIGS. 10-15 illustrate exemplary implementations and use-cases of the disclosures presented herein. FIGS. 13-14 specifically illustrate phases of a tree felling operating that may deploy roller 100 such as those described herein. FIG. 10 illustrates two heavy equipment machines in preparation to perform a tree felling operation of a tree grouping 902. FIG. 11 illustrates a first phase of an exemplary tree felling operation. FIG. 12 illustrates a second phase of an exemplary tree felling operation. FIGS. 13-14 illustrate a third phase of an exemplary tree felling operation. FIG. 15 illustrates an alternative implementation of a tree felling operation.

FIG. 10 illustrates the first heavy equipment 906 and the second heavy equipment 908 stationed in preparation to perform a tree felling operation on the tree grouping 902. In some instances, it is beneficial to perform tree felling operations in preparation for a potential forest fire or to curtail the progression of an active forest fire. This type of tree felling operation is typically performed to create a gap within the tree grouping 902 such that the fire cannot easily hop from tree to tree and burn through the entire tree grouping. When the tree felling operation is performed on the tree grouping 902, then a fire may be halted at the edge of the gap because the fire cannot move to the trees on the opposite end of the gap.

FIG. 11 illustrates a first phase of an exemplary tree felling operation. The first heavy equipment 906 cuts the first tree felling track 1102 through the tree grouping. Depending on the landscape of the tree grouping, the first tree felling track 1102 might not be a straight line and may traverse changes in elevation. For purposes of illustrate, the first tree felling track 1102 illustrated in FIG. 11 is shown as a straight line, but it should be appreciated that a tree felling track is typically not a straight line in typical real-world implementations.

The first heavy equipment 906 includes numerous sensors for tracking the operation of cutting the first tree felling track 1102. The first heavy equipment 906 may include, for example, a GPS receiver, an accelerometer, a gyro meter, a magnetometer, a winch sensor, and so forth. The first heavy equipment 906 collects sensor data while it traverses the first tree felling track 1102 and determines precise location coordinates for the length of the first tree felling track 1102.

In an embodiment, the first heavy equipment 906 includes a computing system having one or more processors for executing instructions stored in non-transitory computer readable storage media. The instructions may include receiving location coordinate data from the GPS 910, and may further include receiving timestamped location coordinate data from the GPS 910 for the duration of the time the first heavy equipment 906 is cutting the first tree felling track 1102. The instructions may further include receiving sensor data from one or more sensors on the first heavy equipment 906, including for example, accelerometer sensor data, gyro meter sensor data, magnetometer sensor data, winch release sensor data, and so forth. The instructions may further include merging one or more forms of sensor data to generate merged data. The instructions may further include assessing the sensor data and/or the location coordinate data to calculate a precise path of the first tree felling track 1102 including GPS location coordinates for the first tree felling track 1102. The precise path of the first tree felling track 1102 may further include information about elevation changes or tilting of the first heavy equipment 906 for the duration of the tree felling operation. The first heavy equipment 906 stores the path for the first tree felling track 1102. In an embodiment, the first heavy equipment 906 transmits the path for the first tree felling track 1102 to the second heavy equipment 908 by way of long-range radio waves, short-range wireless technology such as Bluetooth® communication, or some other communication technology.

FIG. 12 illustrates a second phase of the exemplary tree felling operation. The second phase of the tree felling operation includes cutting a second tree felling track 1104 that runs parallel to the first tree felling track 1102. If the first tree felling track 1102 includes turns, curves, or changes in direction, then the second tree felling track 1102 will include the same turns, curves, and changes in direction to ensure the first tree felling track 1102 and the second tree felling track 1104 are parallel. The second tree felling track 1104 is located a set distance away from the first tree felling track 1102 depending on the end-goals of the tree felling operation. In an example implementation, the first tree felling track 1102 and the second tree felling track 1104 are between 900 feet to 500 feet away from one another. It should be appreciated that the distance between the first tree felling track 1102 and the second tree felling track 1104 is implementation-specific and that any suitable distance falls within the disclosures herein.

It should be appreciated that the second phase of the tree felling operation may be performed by the same heavy equipment that executed the first phase of the tree felling operation. When the first phase and the second phase are performed by the same heavy equipment, then the path of the first tree felling track 1102 may be stored locally at the same heavy equipment and then referred to when cutting the path of the second tree felling track 1104.

In an embodiment, the second phase of the tree felling operation is performed by a different heavy equipment machine when compared with the first phase of the tree felling operation. In such an embodiment, the first heavy equipment 906 cuts the first tree felling track 1102 and determines the path of the first tree felling track based on sensor data generated when the first heavy equipment 906 cut the first tree felling track 1102. The path of the first tree felling track 1102 is an electronic file (may be referred to herein as the first tree felling track file) including precise location coordinates for the first tree felling track 1102 along with additional valuable sensor data, such as an indication of changes in elevation or tilting experienced by the first heavy equipment 906. The first heavy equipment 906 sends the path of the first tree felling track to the second heavy equipment 908.

The second heavy equipment 908 receives the path of the first tree felling track from the first heavy equipment 906 by way of a communication 912. The second heavy equipment 908 then cuts the second tree felling track 1104 parallel to the first tree felling track 1102. In an embodiment, a user may manually input a desired distance between the first tree felling track 1102 and the second tree felling track 1104 or the desired distance may be calculated based on environmental data, saved operational files, and so forth. The second heavy equipment 908 then cuts the second tree felling track 1104 to be parallel to the first tree felling track 1102 with the help of the heavy equipment syncing platform 904. In an embodiment, the second heavy equipment 908 is automated to execute cutting the second tree felling track 1104 without human intervention and with the assistance of the heavy equipment syncing platform 904. In an embodiment, an operation of the second heavy equipment 908 cuts the second tree felling track 1104 with the assistance of the heavy equipment syncing platform 904.

In an embodiment, the heavy equipment syncing platform 904 provides directional information to a controller for the second heavy equipment 908 such that the second heavy equipment 908 can automatically cut the second tree felling track 1104 without human intervention. In an embodiment, the heavy equipment syncing platform 904 provides messages, notifications, and information on a dashboard to an operator of the second heavy equipment 908 such that the operator can control the second heavy equipment 908 and cut the second tree felling track 1104 parallel to the first tree felling track 1102.

In an embodiment, while the second heavy equipment 908 is cutting the second tree felling track 1104 (either automatically or with a human operator), the heavy equipment syncing platform 904 provides detailed instructions on how to cut the second tree felling track 1104 to be parallel with the first tree felling track 1102. For example, the heavy equipment syncing platform 904 may provide a code-based instruction, a text-based readable instructions, and/or a verbalized instruction that the second heavy equipment 908 needs to turn a number of degrees to the left or the right to remain parallel with the first tree felling track 1102. Further for example, the heavy equipment syncing platform 904 may provide warnings about anticipated changes in elevation, tilts to the landscape, hard turns, and so forth. The heavy equipment syncing platform 904 provides necessary information and guidance to the second heavy equipment 908 (either a controller of the equipment itself or a human operator) such that the second tree felling track 1104 remains parallel to the first tree felling track 1102.

FIGS. 13-14 illustrate a third phase of the exemplary tree felling operation. At the start of the third phase, each of the first tree felling track 1102 and the second tree felling track 1104 has been successfully cut down. The trees within these tracks additionally may be removed from the site. The first heavy equipment 906 and the second heavy equipment 908 may return to the "starting line" of the respective tracks or may begin at the "finish line" of the respective tracks and traverse the tracks backwards. During the third phase, the first heavy equipment 906 and the second heavy equipment 908 are connected to one another with a cable, chain, or other heavy-duty rope-like connection (may be referred to herein as a "cable" to generically refer to any of the above). In an embodiment, in the middle of the cable is a roller 100 such as those described and illustrated in connection with FIGS. 1-8. The roller 100 may be large and very heavy such that the roller 100 can roll along the ground and knock over, uproot, and/or crush trees within its path. In an embodiment, each heavy equipment 906, 908 has a separate cable extending from a winch that is attached to the connection rod 106 of the roller 100.

In existing implementations, the roller 100 is not attached to the cable but is instead free such that it can roll on its own. In such an implementation, the cable may be used to pull or drag the roller 100 in the desired direction. Specifically, in this implementation, the roller 100 may pose a serious danger to the operators of the heavy equipment 906, 908 if the trajectory or speed of the roller 100 are not continually controlled. For example, if the heavy equipment 906, 908 and the roller 100 are travelling downhill, the roller 100 may gather speed and begin to roll in undesirable directions. For this reason, it can be imperative that the trajectory and speed of the roller are controlled by the first heavy equipment 906 and the second heavy equipment 908. This can most effectively be accomplished by ensuring the roller 100 is located at the midpoint between the heavy equipment 906, 908, ensuring the cable between the heavy equipment 906, 908 is taught, and ensuring the heavy equipment 906, 908 are in line with one another such that one heavy equipment is not in front of or lagging behind the other. Each of these considerations is accomplished by way of the communications 912 between the first heavy equipment 906 and the second heavy equipment 908, along with the information provided by the heavy equipment syncing platform 904.

During the third phase, the first heavy equipment 906 and the second heavy equipment 908 are continually in communication with one another by way of some form of communication 912. In an embodiment, the heavy equipment 906, 908 communicate real-time location coordinates and sensor data to one another continually throughout execution of the third phase. This can be especially important when there is a roller 100 attached to the cable. The roller may be extremely heavy and large such that it poses a significant danger to the operators of the heavy equipment 906, 908 and the heavy equipment itself if the trajectory of the roller 100 is not properly controlled. For this reason, it is important to control the location and speed of the roller 100 throughout execution of the third phase. This may be most effectively accomplished by ensuring the roller 100 remains in the middle point between the first heavy equipment 906 and the second heavy equipment 908 and ensuring that the first heavy equipment 906 and the second heavy equipment 908 are lined up such that one is not in front of or lagging behind the other.

During the third phase, the first heavy equipment 906 and the second heavy equipment 908 continually communicate 912 real-time location coordinates and sensor data to one another. The communications 912 between the heavy equipment 906, 908 may occur five times per second in one exemplary embodiment. Each of the heavy equipment 906, 908 may include a system including one or more processors for analyzing the location coordinates and sensor data and presenting this information to an operator by way of the heavy equipment syncing platform 904. Additionally, the information presented in the heavy equipment syncing platform 904 may be received from the heavy equipment syncing server 902 by way of a cellular network connection or a satellite communication connection. In an embodiment, each of the heavy equipment 906, 908 includes a screen for displaying the heavy equipment syncing platform 904 and providing operational messages to an operator of the heavy equipment 906, 908.

In an embodiment, one or more on-board processors of the heavy equipment 906, 908 receive communications 912 from the other heavy equipment and receive sensor data from the instant heavy equipment 906, 908. The one or more on-board processors analyze the sensor data captured by its own sensors and the sensor data captured by the other heavy equipment 906, 908. Based on this analysis, the on-board processors determine whether the instant heavy equipment 906, 908 should turn, slow down, speed up, remain on the present course, or change course to ensure that the two heavy equipment 906, 908 are in line with one another, that the slack of the cable is sufficiently taught, and that the roller 100 remains at the midpoint between the heavy equipment 906, 908. The onboard processors may generate a message to be displayed or verbalized to an operator of the heavy equipment 906, 908 and/or electronically transmitted to an electronic controller, driver assistance system, or automated driving system of the heavy equipment 906, 908. The message may indicate for example, that the two heavy equipment 906, 908 are no longer in-line and that the instant heavy equipment should slow down or speed up. The message may indicate that the slack on the cable is not sufficiently taught or is excessively taught, and that the winch should be wound to pull in more cable or release more cable. The message may indicate, for example, that the heavy equipment 906, 908 should make a turn at certain degrees to the left or the right. The message may indicate, for example, that the heavy equipment 906, 908 are in line with one another and that the operation is proceeding as planned. Such a message may indicate that no changes in speed, direction, cable slack, or other parameters need to be adjusted at the present time.

In an embodiment, the instructions for changing a parameter or maintain the current course may be received from the heavy equipment syncing server by way of a cellular network connection or a satellite communication connection. These instructions might be provided in real time based on output from a neural network trained to analyze satellite imagery of forests and/or the sensor data generated by the heavy equipment 906, 908. These instructions might be manually input be a user interacting with the heavy equipment syncing platform 904 in communication with the heavy equipment syncing server 902. For example, a forest fire manager or wildlife service contractor may be provide instructions via the heavy equipment syncing platform 904 indicating that the heavy equipment 906, 908 should change course, alter the original tree felling plan, engage in a new tree felling plan, continue the present course, evacuate the area, and so forth. In an embodiment, an emergency evacuation message is transmitted to the heavy equipment 906, 908, and the emergency evacuation message is transmitted from the heavy equipment syncing server 902.

FIG. 14 illustrates a continuation of the third phase of the exemplary tree felling operation that is illustrated in FIG. 13. In FIG. 14, the heavy equipment 906, 908 are travelling along the first tree felling track 1102 and the second tree felling track 1104 in line with one another while pulling the roller 100 along the area located between the first tree felling track 1102 and the second tree felling track 1104. The cable and the roller 100 may be configured to break, pull, and/or drag the trees located in the space between the first tree felling track 1102 and the second tree felling track 1104. At the end of the third phase, the heavy equipment 906, 908 will have traversed the entire tree felling tracks and cleared the space located between the tree felling tracks.

FIG. 15 illustrates a space that has been successfully cleared. The dotted line illustrates the space 1502 created by way of the tree felling operation. The space 1502 includes the first tree felling track 1102, the second tree felling track 1104, and the space between the first and second tree felling tracks 1102, 1104. This space may serve to prevent the spread of forest fires. For example, if a fire is burning at the upper portion of the trees, the fire might not successfully transfer to the lower portion of trees because the space 1502 is sufficiently large to prevent sparks from travelling to the lower portion of trees (and vice versa).

Figure 16:
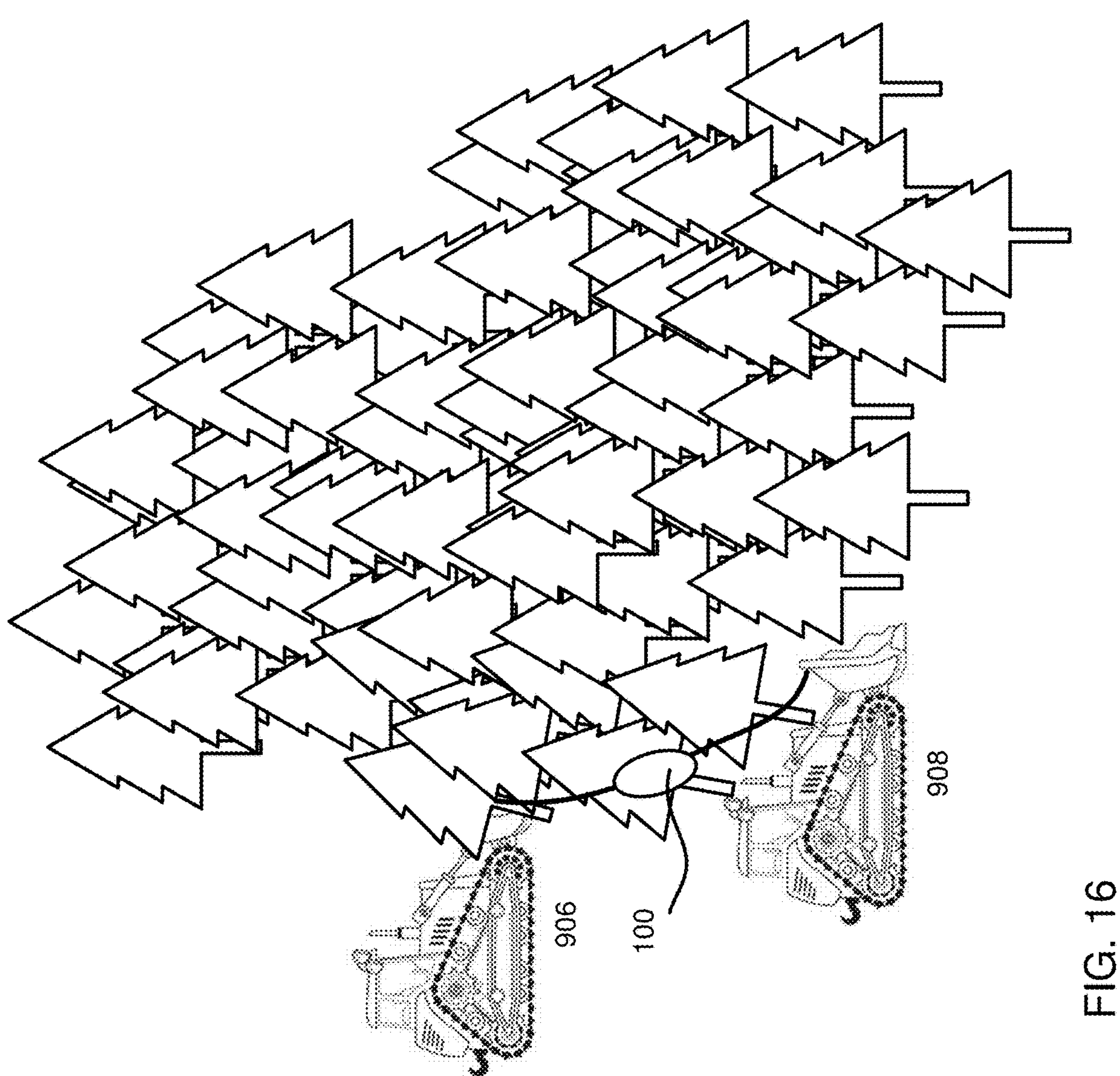
FIG. 16 illustrates an exemplary execution of a tree felling operation.

FIG. 16 illustrates an alternative tree felling operation. In the alternative tree felling operation, the first heavy equipment 906 and the second heavy equipment 908 are connected to one another by way of one or more cables and the roller 100. In this alternative operation, the heavy equipment 906, 908 pull the roller 100 through the tree grouping without first cutting a tree felling track. Again, in this implementation, the heavy equipment 906, 908 may communicate 912 with one another in real-time to ensure the cable has sufficient slack, the heavy equipment 906, 908 are traversing the correct path, and the roller 100 is safely located between the heavy equipment 906, 908. Notably, while performing a tree felling operation, the operators of the heavy equipment 906, 908 likely will not be able to see one another, and therefore it is imperative that the operators can receive guidance and communications from the heavy equipment syncing platform 904 to ensure the safety of the operators and the equipment 906, 908 itself.

Figure 17:
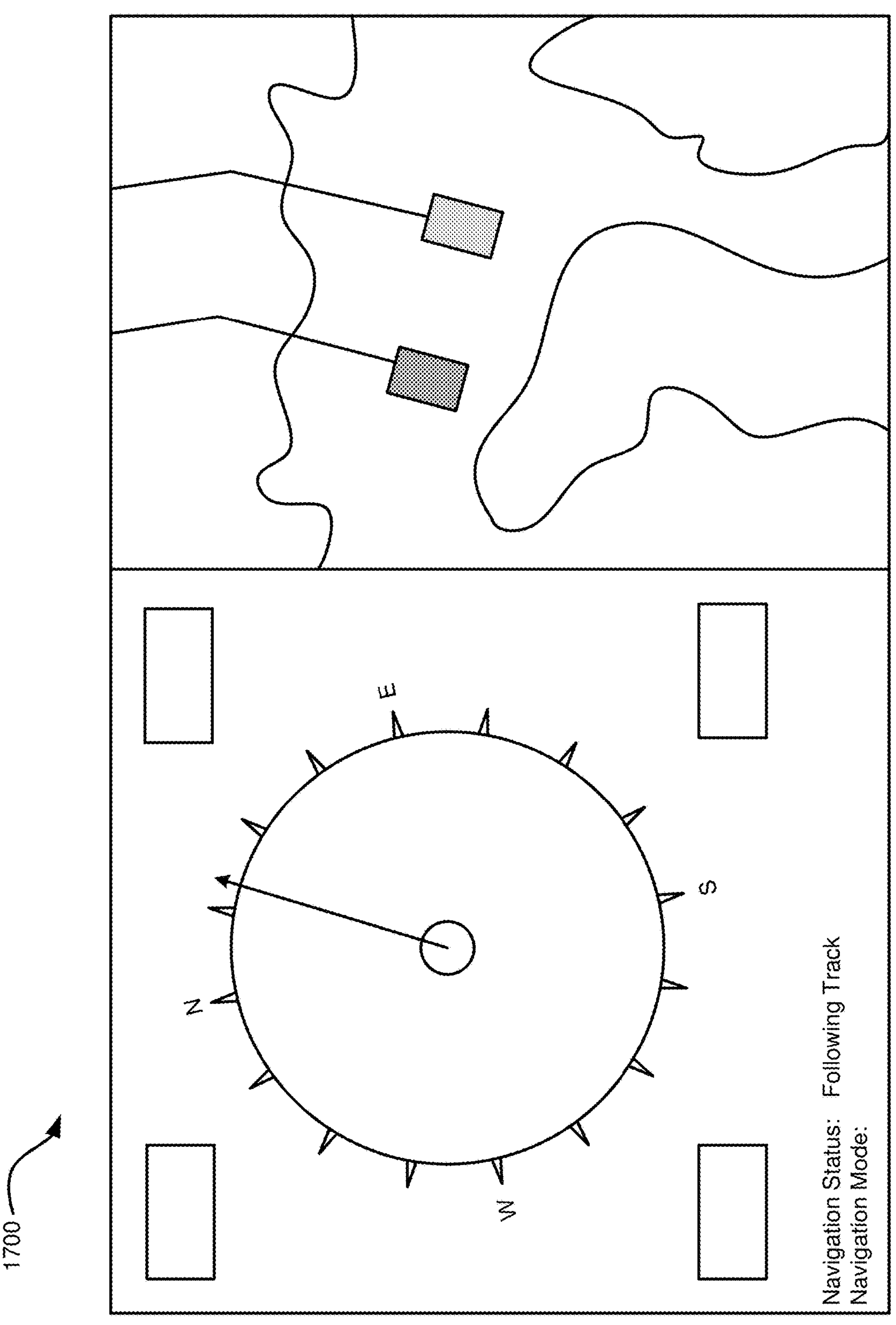
FIG. 17 is a screenshot of an exemplary user interface of a heavy equipment syncing platform.

FIG. 17 illustrates an exemplary screenshot 1700 of a user interface of the heavy equipment syncing platform 904. This user interface may specifically be accessible on a screen located within the heavy equipment 906, 908 to provide real-time instructions, sensor data, and guidance to an operator of the heavy equipment 906, 908.

Figure 18:
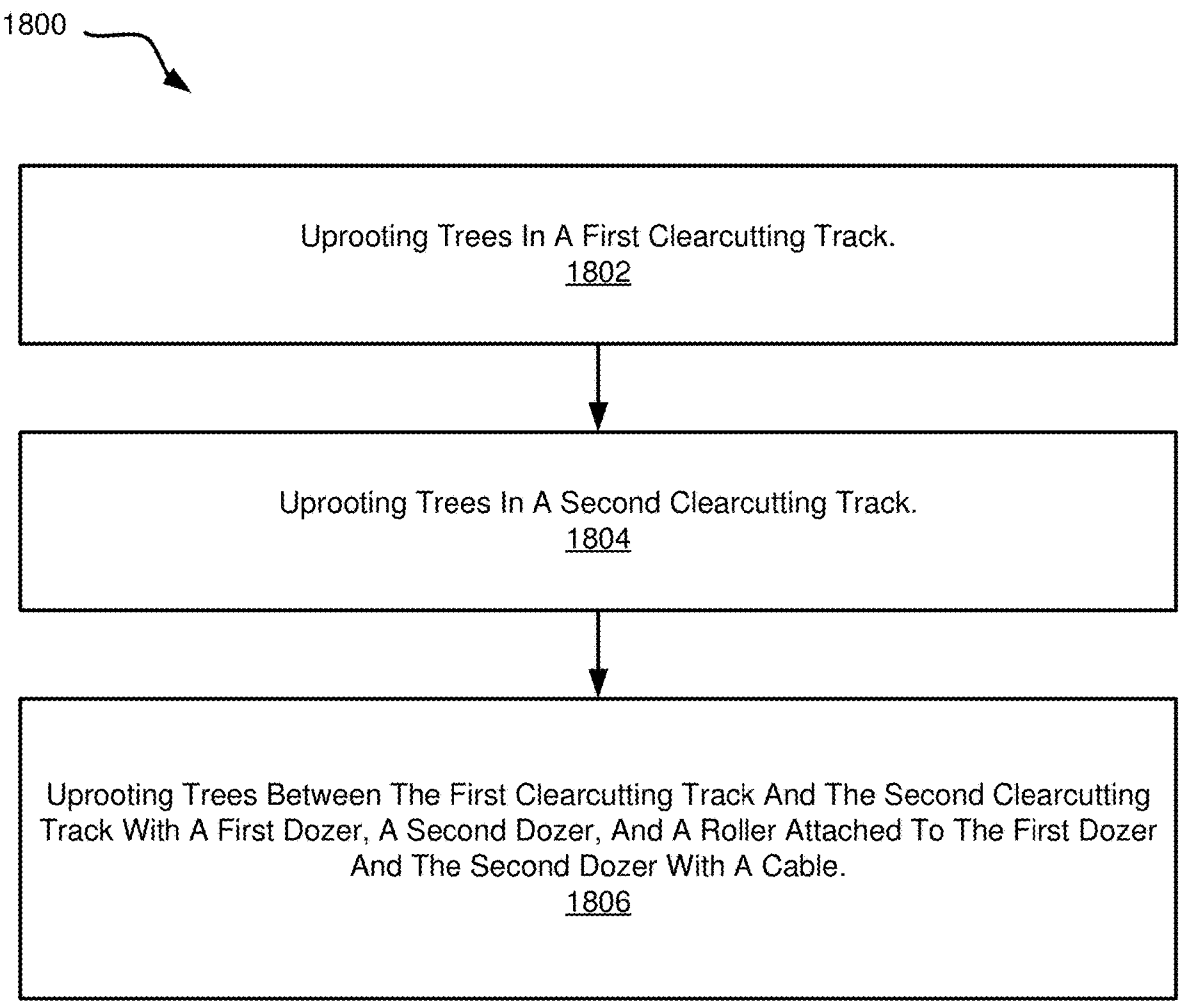
FIG. 18 is a schematic flow chart diagram of a method for a tree felling operation.

FIG. 18 is a schematic flow chart diagram of a method 1800 for executing a tree felling operation. The method 1800 begins and a dozer uproots at 1802 trees in a first tree felling track. The method 1800 continues and a dozer uproots at 1804 trees in a second tree felling track. The method 1800 continues and a first dozer and a second dozer uproot trees between the first tree felling track and the second tree felling track. There is a roller attached to the first dozer and the second dozer by way of one or more cables.

EXAMPLES

The following examples pertain to further embodiments.

Example 1 is a device for roller felling trees. The device includes a midsection comprising a cylindrical shape and a midsection diameter. The device includes an end plate comprising an elliptical shape and an end plate diameter, wherein the end plate diameter is smaller than the midsection diameter. The device includes a stabilizing section attached to a concentric perimeter of the midsection on a first end and attached to a perimeter of the end plate on a second end.

Example 2 is a device as in Example 1, wherein: the end plate comprises a first end plate and a second end plate; the first end plate and the second end plate are parallel to one another; and the midsection is located in between the first end plate and the second end plate.

Example 3 is a device as in any of Examples 1-2, wherein: the stabilizing section comprises a first stabilizing section and a second stabilizing section; the first stabilizing section is attached to a first concentric perimeter of the midsection on a first end and attached to a perimeter of the first end plate on a second end; the second stabilizing section is attached to a second concentric perimeter of the midsection on a first end and attached to a perimeter of the second end plate on a second end; and the midsection is located in between the first stabilizing section and the second stabilizing section.

Example 4 is a device as in any of Examples 1-3, further comprising a connection rod disposed through an interior of the device at an axis of rotation for the device, wherein the connection rod is attached to the first end plate and the second end plate.

Example 5 is a device as in any of Examples 1-4, wherein the connection rod comprises a hole disposed therethrough for receiving a cable and maintaining the cable at a cable height, wherein the cable height is a distance from the concentric perimeter of the midsection to the axis of rotation for the device.

Example 6 is a device as in any of Examples 1-5, further comprising a connection rod secured to the end plate, wherein the connection rod comprises an attachment hole disposed therethrough for receiving a cable.

Example 7 is a device as in any of Examples 1-6, wherein the end plate is removably attached to the stabilizing section such that an interior cavity can be accessed, wherein the interior cavity is defined at least in part by an inner wall of the stabilizing section, and wherein the interior cavity is configured for receiving a weight.

Example 8 is a device as in any of Examples 1-7, further comprising a brace plate comprises an elliptical shape, wherein an outer perimeter of the brace plate is secured to the concentric perimeter of the midsection.

Example 9 is a device as in any of Examples 1-8, wherein the stabilizing section comprises a plurality of flat portions, wherein the plurality of flat portions collectively gives the stabilizing section a semi-conical shape.

Example 10 is a device as in any of Examples 19, further comprising a pipe defining an interior tunnel, wherein the pipe is disposed through an interior of the device and secured to the end plate, and wherein the device further comprises a connection rod disposed within the interior tunnel.

Example 11 is a system for executing a tree felling operation. The system comprises a device. The device includes a midsection comprising a cylindrical shape and a midsection diameter. The device includes an end plate comprising an elliptical shape and an end plate diameter, wherein the end plate diameter is smaller than the midsection diameter. The device includes a stabilizing section attached to a concentric perimeter of the midsection on a first end and attached to a perimeter of the end plate on a second end.

Example 12 is a system as in Example 11, wherein: the end plate comprises a first end plate and a second end plate; the first end plate and the second end plate are parallel to one another; and the midsection is located in between the first end plate and the second end plate.

Example 13 is a system as in any of Examples 11-12, wherein: the stabilizing section comprises a first stabilizing section and a second stabilizing section; the first stabilizing section is attached to a first concentric perimeter of the midsection on a first end and attached to a perimeter of the first end plate on a second end; the second stabilizing section is attached to a second concentric perimeter of the midsection on a first end and attached to a perimeter of the second end plate on a second end; and the midsection is located in between the first stabilizing section and the second stabilizing section.

Example 14 is a system as in any of Examples 11-13, further comprising a connection rod disposed through an interior of the device at an axis of rotation for the device, wherein the connection rod is attached to the first end plate and the second end plate.

Example 15 is a system as in any of Examples 11-14, wherein the connection rod comprises a hole disposed therethrough for receiving a cable and maintaining the cable at a cable height, wherein the cable height is a distance from the concentric perimeter of the midsection to the axis of rotation for the device.

Example 16 is a system as in any of Examples 11-15, further comprising a connection rod secured to the end plate, wherein the connection rod comprises an attachment hole disposed therethrough for receiving a cable attached to heavy equipment.

Example 17 is a system as in any of Examples 11-16, wherein the end plate is removably attached to the stabilizing section such that an interior cavity can be accessed, wherein the interior cavity is defined at least in part by an inner wall of the stabilizing section, and wherein the interior cavity is configured for receiving a weight.

Example 18 is a system as in any of Examples 11-17, further comprising a brace plate comprises an elliptical shape, wherein an outer perimeter of the brace plate is secured to the concentric perimeter of the midsection.

Example 19 is a system as in any of Examples 11-18, wherein the stabilizing section comprises a plurality of flat portions, wherein the plurality of flat portions collectively gives the stabilizing section a semi-conical shape.

Example 20 is a system as in any of Examples 11-19, further comprising a pipe defining an interior tunnel, wherein the pipe is disposed through an interior of the device and secured to the end plate, and wherein the device further comprises a connection rod disposed within the interior tunnel.

Reference throughout this specification to "an example" means that a particular feature, structure, or characteristic described in connection with the example is included in at least one embodiment of the disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the disclosure may be referred to herein along with alternatives for the various components thereof. It is understood that such embodiments, examples, and alternatives are not to be construed as de facto equivalents of one another but are to be considered as separate and autonomous representations of the disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A device for roller felling trees comprising:

a midsection comprising a first end comprising a first concentric perimeter, a second end comprising a second concentric perimeter, and a midsection diameter, the midsection having a cylindrical shape;

a first brace plate and a second brace plate, wherein a first outer perimeter of the first brace plate and a second outer perimeter of the second brace plate are each secured to an interior of the midsection;

a first plate comprising an elliptical shape and a first plate diameter, wherein the first plate diameter is smaller than the midsection diameter;

a first stabilizing section having a semi-conical shape attached to the first end of the midsection and disposed between the first end of the midsection and the first plate;

a second plate comprising an elliptical shape and a second plate diameter, wherein the second plate diameter is smaller than the midsection diameter;

a second stabilizing section having a semi-conical shape attached to the second end of the midsection and disposed between the second end of the midsection and the second plate;

wherein the first plate is attached directly to the first stabilizing section and the second plate is attached directly to the stabilizing section; and a connection rod disposed in an interior of the device at an axis of rotation for the device, wherein the connection rod is attached to the first plate and the second plate, and wherein the connection rod is configured to releasably attach to a cable that is attached to a heavy equipment such that the device is configured to be pulled along the ground by the heavy equipment to roller fell the trees.

2. The device of claim 1, wherein:

the first plate and the second plate are parallel to one another; and the midsection is located in between the first plate and the second plate.

3. The device of claim 2, wherein:

the first stabilizing section is attached to the first concentric perimeter of the midsection and a perimeter of the first plate;

the second stabilizing section is attached to the second concentric perimeter of the midsection and a perimeter of the second plate; and the midsection is located in between the first stabilizing section and the second stabilizing section.

4. The device of claim 1, wherein the connection rod comprises a hole for receiving the cable and maintaining the cable at a cable height, wherein the cable height is a distance from the first concentric perimeter of the midsection or from the second concentric perimeter of the midsection to the axis of rotation for the device.

5. The device of claim 1, wherein the connection rod comprises an attachment hole disposed therethrough for receiving the cable.

6. The device of claim 1, wherein the first plate and the second plate are removably attached to the stabilizing section such that an interior cavity is accessible, wherein the interior cavity is defined at least in part by an inner wall of the stabilizing section, and wherein the interior cavity is configured for receiving a weight.

7. The device of claim 1, wherein the first stabilizing section comprises a plurality of flat portions, and wherein the plurality of flat portions collectively gives the first stabilizing section the semi-conical shape; and wherein the second stabilizing section comprises a plurality of flat portions, and wherein the plurality of flat portions collectively gives the second stabilizing section the semi-conical shape.

8. The device of claim 1, further comprising a through-pipe defining an interior tunnel, wherein the through-pipe is disposed through an interior of the device and secured to the first plate and the second plate, and wherein the device further comprises the connection rod disposed within the through-pipe.

9. A system for roller felling trees, the system comprising:

one or more dozers;

a cable connected to at least one of the one or more dozers; and a device attached to the cable, the device comprising:

a midsection comprising a first end comprising a first concentric perimeter, a second end comprising a second concentric perimeter, and a midsection diameter, the midsection having a cylindrical shape;

a first brace plate and a second brace plate, wherein a first outer perimeter of the first brace plate and a second outer perimeter of the second brace plate are each secured to an interior of the midsection;

a first plate comprising an elliptical shape and a first plate diameter, wherein the first plate diameter is smaller than the midsection diameter;

a first stabilizing section having a semi-conical shape attached to the first end of the midsection and disposed between the first end of the midsection and the first plate;

a second plate comprising an elliptical shape and a second plate diameter, wherein the second plate diameter is smaller than the midsection diameter;

a second stabilizing section having a semi-conical shape attached to the second end of the midsection and disposed between the second end of the midsection and the second plate, wherein the first plate is attached directly to the first stabilizing section and the second plate is attached directly to the second stabilizing section; and a connection rod disposed in an interior of the device at an axis of rotation for the device, wherein the connection rod is attached to the first plate and the second plate, and wherein the connection rod is configured to releasably attach to the cable that is connected to the at least one of the one or more dozers such that the device is configured to be pulled along the ground by at least one of the one or more dozers to roller fell the trees.

10. The system of claim 9, wherein the device is such that:

the first plate and the second plate are parallel to one another; and the midsection is located in between the first plate and the second plate.

11. The system of claim 10, wherein the device is such that:

the first stabilizing section is attached to the first concentric perimeter of the midsection and a perimeter of the first plate;

the second stabilizing section is attached to the second concentric perimeter of the midsection and a perimeter of the second plate; and the midsection is located in between the first stabilizing section and the second stabilizing section.

12. The system of claim 9, wherein the connection rod comprises a hole for receiving the cable and maintaining the cable at a cable height, wherein the cable height is a distance from the first concentric perimeter of the midsection or from the second concentric perimeter of the midsection to the axis of rotation for the device.

13. The system of claim 9, wherein the connection rod comprises an attachment hole disposed therethrough for receiving the cable connected to the at least one of the one or more dozers.

14. The system of claim 9, wherein the first plate and the second plate are removably attached to the stabilizing section such that an interior cavity is accessible, wherein the interior cavity is defined at least in part by an inner wall of the stabilizing section, and wherein the interior cavity is configured for receiving a weight.

15. The system of claim 9, wherein the first stabilizing section comprises a plurality of flat portions, and wherein the plurality of flat portions collectively gives the first stabilizing section the semi-conical shape; and wherein the second stabilizing section comprises a plurality of flat portions, and wherein the plurality of flat portions collectively gives the second stabilizing section the semi-conical shape.

16. The system of claim 9, wherein the device further comprises a through-pipe defining an interior tunnel, wherein the through-pipe is disposed through an interior of the device and secured to the first plate and the second plate, and wherein the device further comprises a connection rod disposed within the through-pipe.

17. A device for roller felling trees, the device comprising:

a midsection comprising a first end comprising a first concentric perimeter, a second end comprising a second concentric perimeter, and a midsection diameter, the midsection having a cylindrical shape;

a first plate comprising an elliptical shape and a first plate diameter, wherein the first plate diameter is smaller than the midsection diameter;

a first stabilizing section having a semi-conical shape attached to the first end of the midsection and disposed between the first end of the midsection and the first plate;

a second plate comprising an elliptical shape and a second plate diameter, wherein the second plate diameter is smaller than the midsection diameter;

a second stabilizing section having a semi-conical shape attached to the second end of the midsection and disposed between the second end of the midsection and the second plate;

wherein the first plate is attached directly to the first stabilizing section and the second plate is attached directly to the stabilizing section;

a first connection rod attached to the first plate, wherein the first connection rod is configured to releasably attach to a first cable that is attached to a first heavy equipment; and a second connection rod attached to the second plate, wherein the second connection rod is configured to releasably attach to a second cable that is attached to a second heavy equipment.

18. The device of claim 1, further comprising a first cable plate and a second cable plate;

wherein the first cable plate is removably attached to the first plate and wherein the second cable plate is removably attached to the second plate; and wherein the connection rod is disposed through each of the first cable plate and to the second cable plate.

19. The system of claim 9, further comprising a first cable plate and a second cable plate;

wherein the first cable plate is removably attached to the first plate and wherein the second cable plate is removably attached to the second plate; and wherein the connection rod is disposed through each of the first cable plate and to the second cable plate.

20. The system of claim 17, further comprising a first cable plate and a second cable plate;

wherein the first cable plate is removably attached to the first plate and wherein the second cable plate is removably attached to the second plate; and wherein the first connection rod is disposed through an opening of the first cable plate; and wherein the second connection rod is disposed through an opening of the second cable plate.

* * * * *